United States Patent
Zhou et al.

(10) Patent No.: US 9,349,006 B2
(45) Date of Patent: May 24, 2016

(54) METHOD AND DEVICE FOR PROGRAM IDENTIFICATION BASED ON MACHINE LEARNING

(75) Inventors: Hongyi Zhou, Beijing (CN); Yi Dong, Beijing (CN); Hui Zhou, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 255 days.

(21) Appl. No.: 13/990,146

(22) PCT Filed: Nov. 18, 2011

(86) PCT No.: PCT/CN2011/082416
§ 371 (c)(1),
(2), (4) Date: Jul. 18, 2013

(87) PCT Pub. No.: WO2012/071989
PCT Pub. Date: Jun. 7, 2012

(65) Prior Publication Data
US 2013/0291111 A1    Oct. 31, 2013

(30) Foreign Application Priority Data

Nov. 29, 2010  (CN) .......................... 2010 1 0565513
Dec. 31, 2010  (CN) .......................... 2010 1 0620202
Dec. 31, 2010  (CN) .......................... 2010 1 0620959

(51) Int. Cl.
G06F 11/00   (2006.01)
G06F 21/56   (2013.01)
G06N 99/00   (2010.01)

(52) U.S. Cl.
CPC ............ G06F 21/562 (2013.01); G06F 21/563 (2013.01); G06N 99/005 (2013.01)

(58) Field of Classification Search
CPC ..... G06F 21/56; G06F 21/566; G06F 21/562; G06F 21/563
USPC ............................... 726/23–24; 714/E11.024
See application file for complete search history.

(56) References Cited

U.S. PATENT DOCUMENTS

2007/0294768 A1*  12/2007  Moskovitch ......... G06N 3/0481
                                                         726/24
2009/0113128 A1    4/2009  Zhao
2010/0153785 A1*   6/2010  Keromytis et al. ............. 714/38

FOREIGN PATENT DOCUMENTS

| CN | 101944167 A | 9/2009 |
| CN | 101593253 A | 12/2009 |
| CN | 101599113 A | 12/2009 |

OTHER PUBLICATIONS

International Search Report based on PCT/CN2011/0824166 filed Nov. 18, 2011.

*Primary Examiner* — Hadi Armouche
*Assistant Examiner* — Angela Holmes
(74) *Attorney, Agent, or Firm* — Troutman Sanders LLP

(57) ABSTRACT

A method and device perform program identification based on machine learning. The method includes: analyzing an inputted unknown program, and extracting a feature of the unknown program; coarsely classifying the unknown program according to the extracted feature; judging by inputting the unknown program into a corresponding decision-making machine generated by training according to a result of the coarse classification; and outputting an identification result of the unknown program. The identification result is a malicious program or a non-malicious program. The method can save a lot of manpower and improve the identification efficiency for a malicious program by using the decision-making machine.

17 Claims, 15 Drawing Sheets

US 9,349,006 B2

METHOD AND DEVICE FOR PROGRAM IDENTIFICATION BASED ON MACHINE LEARNING

BENEFIT CLAIMS

This application is a US National Stage of International Application No. PCT/CN2011/082416, filed Nov. 18, 2011, which claims the benefit of CN 201010565513.9, filed Nov. 29, 2010; CN 201010620202.8 and CN 201010620959.7 both filed Dec. 31, 2010.

FIELD OF THE INVENTION

The application relates to the field of computer technology, and in particular to a method and device for program identification based on machine learning.

BACKGROUND OF THE INVENTION

Malicious programs are a type of special programs which sneak into the computer system of a user without the user's awareness and authorization and attack the system of the user.

A malicious program may comprise a virus, a backdoor program, a Trojan program, a macro virus, a master boot record (MBR) virus, a script virus, etc. Before finding and killing a malicious virus, a malicious program will first be identified; taking finding and killing a virus as an example, the finding and killing is mainly done in the prior art by way of a character string signature and a simple manual summarization, the found and killed viruses are all known viruses, and it is difficult to find and kill a new virus.

The inventors have found in the course of studying the prior art that, in the prior art a heuristic kill-all of artificial rules and a character string signature are substantially adopted, such a way of identifying a malicious program heavily relies on an virus analyst, it needs the analyst to perform a manual analysis for already existing samples and find out a corresponding feature, therefore a large number of experienced persons are needed so as to resolve problems, and because of the technical complexity, the result of manual processing will lead to a low efficiency; in the prior art only a known problem can be processed, while it is impossible to prevent a problem that might happen, therefore there exists a certain hysteresis; since the prior art performs a finding and killing based on a simple feature or rule, an avoidance of being killed is easily achieved by a virus maker.

SUMMARY OF THE INVENTION

The embodiments of the application provide a method and device for program identification based on machine learning to resolve the problems in the prior art of low efficiency and hysteresis when a malicious program is identified.

To resolve the above-mentioned problems, the embodiments of the application provide the following technical solution:

A method for program identification based on machine learning comprising:

analyzing an inputted unknown program, and extracting a feature of the unknown program;

coarsely classifying the unknown program according to the extracted feature;

judging, by inputting the unknown program into a corresponding decision-making machine generated by training, according to a result of the coarse classification; and outputting an identification result of the unknown program, wherein the identification result is a malicious program or a non-malicious program.

Optionally, said extracting a feature of the unknown program and coarsely classifying the unknown program according to the extracted feature comprise: extracting a class behavior characteristic in the unknown program, wherein the class behavior characteristic comprises an import table library feature and an application programming interface (API) feature of an import table; and coarsely classifying the unknown program according to the extracted class behavior characteristic;

or, said extracting a feature of the unknown program and coarsely classifying the unknown program according to the extracted feature comprise: extracting a structural feature of a PE file in the unknown program; and coarsely classifying the unknown program according to the extracted structural feature of a PE file.

Optionally, the import table library feature comprises: a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; and the API feature of an import table is a function feature selected from a library of the import table.

Optionally, said structural feature of a PE file comprises at least one of the following features: a PE file header feature, a PE standard header feature, a PE optional header feature, a data directory feature, a commonly used section table feature.

Optionally, when a plurality of decision-making machines are included, said judging by inputting the unknown program into a corresponding decision-making machine generated by training comprises:

judging by inputting the unknown program into one or more corresponding decision-making machines generated by training, respectively; carrying out a weighted calculation on a result of judgment performed on the unknown program by each decision-making machine according to a preset weight of each kind of feature classification in each decision-making machine.

Said outputting an identification result of the unknown program is in particular: outputting an identification result of the unknown program according to a result of the weighted calculation.

Optionally, said carrying out a weighted calculation on a result of judgment performed on the unknown program by each decision-making machine according to a preset weight of each kind of feature classification in each decision-making machine comprises:

carrying out a weighted calculation on a result of judgment performed on the unknown program by each decision-making machine according to a preset weight of each kind of structural feature classification of a PE file in each decision-making machine;

or, carrying out a weighted calculation on a result of judgment performed on the unknown program by each decision-making machine according to a preset weight of each kind of class behavior characteristic classification in each decision-making machine.

Optionally, further comprising:

inputting extracted massive programs, wherein the massive programs comprise malicious programs and non-malicious programs;

extracting a feature from each program file inputted and coarsely classifying the extracted feature;

training, according to a result of the coarse classification, features of a different category by using a different training model to generate a decision-making machine or a set of decision-making machines for identifying a malicious program.

Optionally, said extracting a feature from each program inputted and coarsely classifying the extracted feature, and training, according to a result of the coarse classification, features of a different category by using a different training model to generate a decision-making machine or a set of decision-making machines for identifying a malicious program comprise:

extracting a structural feature of a PE file from each program inputted and coarsely classifying the extracted structural feature of a PE file, and training, according to a result of the coarse classification, structural features of a PE file of a different category by using a different training model to generate a decision-making machine or a set of decision-making machines for identifying a malicious program;

or, extracting a class behavior characteristic from each program inputted and coarsely classifying the extracted class behavior characteristic, and training, according to a result of the coarse classification, class behavior characteristics of a different category by using a different training model to generate a decision-making machine or a set of decision-making machines for identifying a malicious program.

Optionally, said extracting a feature from each program inputted comprises:

analyzing each program file and extracting a pre-defined feature from the program file;

generating, from extracted features, a feature vector and a black-and-white attribute of each feature vector.

Optionally, said extracting a feature from each program file inputted comprises:

analyzing each program file and extracting a pre-defined structural feature of a PE file from the program file; generating, from extracted structural features of a PE file, a feature vector and a black-and-white attribute of each feature vector;

or, analyzing each program file and extracting a pre-defined class behavior characteristic from the program file; generating, from extracted class behavior characteristics, a feature vector and a black-and-white attribute of each feature vector.

Optionally, said coarsely classifying the extracted feature is in particular:

judging the type of a compiler which compiles to generate a corresponding program according to an entry instruction sequence of a known compiler, and determining a result of the coarse classification of the corresponding program according to the type of compiler, the type of file and/or the type of shelling.

Optionally, a decision-making machine is trained by using a vector machine, or, a decision-making machine is trained by using a decision tree.

Optionally, said training model is a training model with encoding, or a training model with compressing.

A device for program identification based on machine learning comprises:

an extracting unit adapted to analyzing an inputted unknown program, and extracting a feature of the unknown program;

a classifying unit adapted to coarsely classifying the unknown program according to the extracted feature;

a judging unit adapted to judging, by inputting the unknown program into a corresponding decision-making machine generated by training, according to a result of the coarse classification; and an outputting unit adapted to outputting an identification result of the unknown program, wherein the identification result is a malicious program or a non-malicious program.

Optionally, said extracting unit is particularly adapted to analyzing an inputted unknown program, and extracting a class behavior characteristic in the unknown program, wherein the class behavior characteristic comprises an import table library feature and an application programming interface (API) feature of an import table; and said classifying unit is particularly adapted to coarsely classifying the unknown program according to the extracted class behavior characteristic;

or, said extracting unit is particularly adapted to analyzing an inputted unknown program, and extracting a structural feature of a PE file in the unknown program; and said classifying unit is particularly adapted to coarsely classifying the unknown program according to the extracted structural feature of a PE file.

Optionally, said extracting unit is particularly adapted to extracting at least one of the following features in the unknown program: a PE file header feature, a PE standard header feature, a PE optional header feature, a data directory feature, a commonly used section table feature;

or, said extracting unit is particularly adapted to extracting the import table library feature and the API feature of an import table in the unknown program, the import table library feature comprises: a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; and the API feature of an import table is a function feature selected from the library of the import table.

Optionally, said judging unit comprises:

a program inputting unit adapted to, when a plurality of decision-making machines are included, judging by inputting the unknown program into a corresponding plurality of decision-making machines generated by training respectively;

a weighted calculation unit adapted to carrying out a weighted calculation on a result of judgment performed on the unknown program by each decision-making machine according to a preset weight of each kind of feature classification in each decision-making machine;

said outputting unit particularly adapted to outputting an identification result of the unknown program according to a result of the weighted calculation.

Optionally, further comprising:

an inputting unit adapted to inputting extracted massive programs, wherein the massive programs comprise malicious programs and non-malicious programs;

an extracting unit adapted to extracting a feature from each program inputted;

a classifying unit adapted to coarsely classifying the extracted feature;

a generating unit adapted to training, according to a result of the classification, features of a different category by using a different training model in order to generate a decision-making machine or a set of decision-making machines for identifying a malicious program.

Optionally, said extracting unit comprise:

a program file analyzing unit adapted to analyzing each program file and extracting a pre-defined feature from the program file;

a vector attribute generating unit adapted to generating, from extracted features, a feature vector and a black-and-white attribute of each feature vector.

Optionally, said classifying unit is particular adapted to judging the type of a compiler which compiles to generate a corresponding program according to an entry instruction sequence of a known compiler, and determining a result of the coarse classification of the corresponding program according to the type of compiler, the type of file and/or the type of shelling.

Optionally, said feature comprises: a structural feature of a PE file and/or a class behavior characteristic, wherein the class behavior characteristic comprises an import table library feature and an application programming interface (API) feature of an import table.

As can be seen from above, the embodiments of the application, when identifying the type of an unknown program, extract a feature of the unknown program, classify the unknown program according to the extracted feature, judge by inputting the unknown program into a corresponding decision-making machine generated by training according to a result of the classification, and output an identification result of the unknown program. The application adopts the machine learning technology, achieve the decision-making machine for identifying a malicious program by analyzing a large number of program samples, and can save a lot of manpower and improve the identification efficiency for a malicious program by using the decision-making machine; and furthermore, can find an inherent law of programs based on data mining for massive programs, prevent a malicious program that has not happened and make it difficult for a malicious program to avoid being killed.

BRIEF DESCRIPTION OF THE DRAWINGS

For a clearer description of the embodiments of the invention and technical solutions in the prior art, drawings required for using in the description of the embodiments and the prior art will be simply introduced in the following; obviously, the drawings in the following description are only some embodiments of the invention, and for those skilled in the art, other drawings may also be obtained from these drawings without paying a creative work.

DETAILED DESCRIPTION OF THE INVENTION

The following embodiments of the application provide a method and device for program identification based on machine learning. The application adopts an MLD (Machine Learning Detection) technology in which a model for identifying a malicious program is obtained by analyzing a lot of program samples, and by means of the model, the identification efficiency for a malicious program may be increased, and a malicious that did not happen yet may be prevented, thereby making it difficult for a malicious program to avoid being killed.

To make the technical solutions in the embodiments of the application be better understood by those skilled in the art, and to make the above objects, features and advantages more obvious and easily understood, in the following the technical solutions in the embodiments of the application will be further described in connection with the appended drawings.

Figure 1:
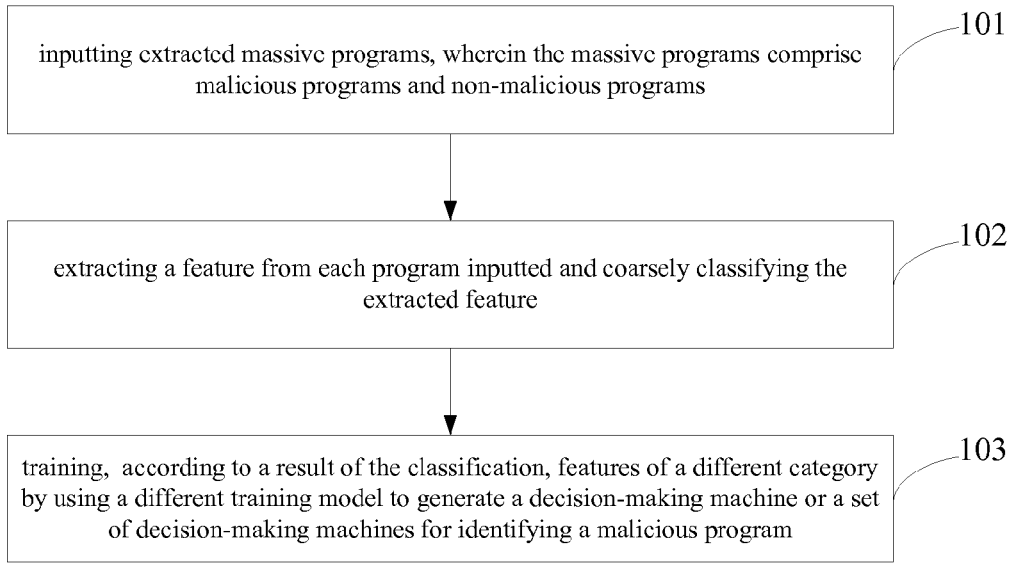
FIG. 1 is a flow chart of an embodiment of the application which generates a decision-making machine identifying the type of a program.

Reference is made to FIG. 1, which is a flow chart of an embodiment of the application which generates a decision-making machine identifying the type of a program.

In step 101, extracted massive programs are inputted, wherein the massive programs comprise malicious programs and non-malicious programs.

In step 102, a feature is extracted from each program inputted and a coarse classification is performed for the extracted feature.

In particular, each program file is analyzed and a pre-defined feature is extracted from the program file; a feature vector and a black-and-white attribute of each feature vector are generated from extracted features.

The type of a compiler which compiles to generate a corresponding program is judged according to an entry instruction sequence of a known compiler, and a result of the coarse classification of the corresponding program may be determined according to the type of compiler, the type of file and/or the type of shelling, etc.

Therein, the coarse classification may for example classify the inputted program into different categories, such as a driver file, VB, VC, DELPHI, UPX, UPACK, NSPACK, ASPACK, etc. according to the characteristics of file, the type of compiler and/or the type of shelling, etc., and then a targeted training is performed.

In step 103, according to a result of the coarse classification, features of different categories are trained by using a different training model to generate a decision-making machine or a set of decision-making machines for identifying a malicious program.

Therein, different decision-making machines may be trained by using the same or different manners. For example, a decision-making machine may be trained by using a vector machine, or a decision-making machine may be trained by using a decision tree. The training model may be a training model with encoding, or a training model with compressing.

Or, according to a result of the classification, features of different categories are trained by different decision-making machines to generate a training model or a set of training models for identifying a malicious program. Therein, for different decision-making machines, training features by using the same or different manners comprising: training is performed by using a decision-making machine of a support vector machine, or training is performed by using a decision-making machine of a decision tree; the training model may be a training model with encoding, or a training model with compressing.

Figure 2A:
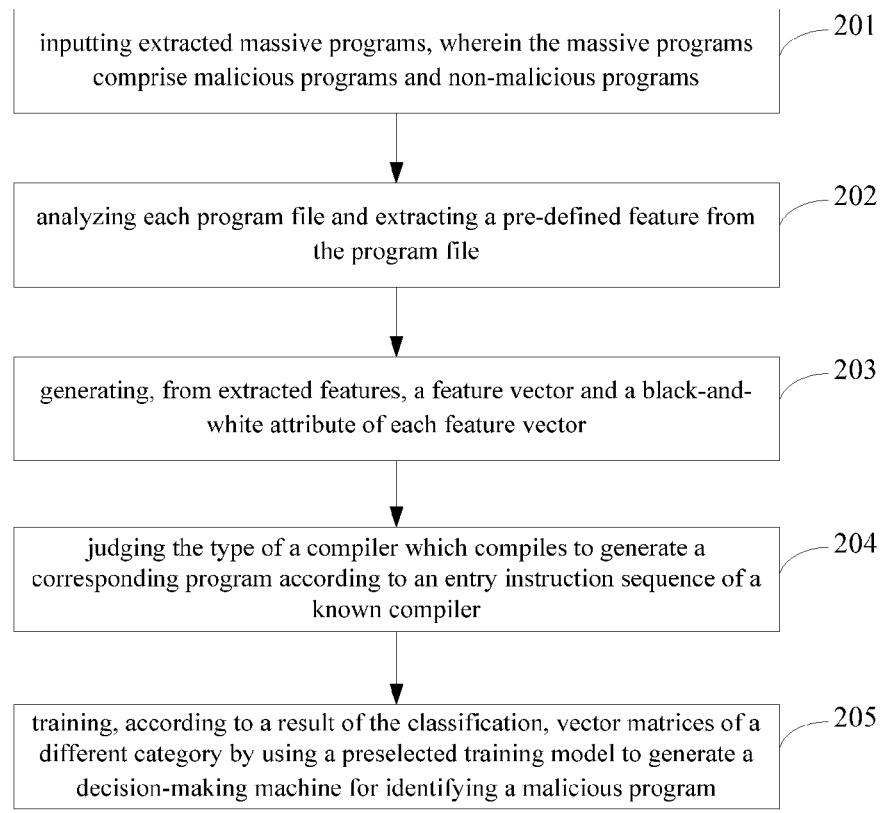
FIG. 2A is a schematic drawing of an application example of an embodiment of the application which generates a decision-making machine identifying the type of a program.

Reference is made to FIG. 2A, which is a flow chart of another embodiment of the application which generates a decision-making machine identifying the type of a program.

In step 201, extracted massive programs are inputted, wherein the massive programs comprise malicious programs and non-malicious programs.

In step 202, each program file is analyzed and a pre-defined feature is extracted from the program file.

In step 203, a feature vector and a black-and-white attribute of each feature vector are generated from extracted features.

A different feature classification contains a different number of specific features. Taking the feature classification being a compiler as an example, a compiler feature which may be specifically included therein is: VC4, VC5, VC6, VC7, VC8, Delphi, BC. In an embodiment of the application, each feature classification may be assigned a classification mark. For example, the classification mark for a compiler is "1". For each specific compiler feature, it may be further assigned a feature mark. For example, the feature mark for VC4 is "1", the feature mark for VC5 is "2", the feature mark for VC6 is "3", the feature mark for VC7 is "4", the feature mark for VC8 is "5", the feature mark for Delphi is "6", and the feature mark for BC is "7".

And then when a feature vector is generated from extracted features, an array of each feature in the feature vector is characterized by its classification mark and feature mark. For example, if the extracted feature is a compiler feature "VC5", its corresponding classification mark is "1", its feature mark is "2", and therefore the information corresponding to "VC5" in the feature vector may be represented as "1:2"; similarly, a specific feature belonging to other feature classification is also represented in the above form, and as shown in the following is an illustration of a feature vector of four features extracted from a program: 1:0 2:121 100:12345678 5000: 365.

A black-and-white attribute of a feature vector is used for indicating whether a program containing the features in the feature vector belongs to a malicious program or a non-malicious program, wherein it corresponds to a non-malicious program if the attribute is "white", and it corresponds to a malicious program if the attribute is "black"; and furthermore, a mark may be defined as "0" for a white attribute, and a mark may be defined as "1" for a black attribute. Then, after a feature vector is generated for each program, it may be assigned an attribute mark according to the information contained in the feature vector. For example, if an attribute mark assigned to the above-mentioned feature vector "1:0 2:121 100:12345678 5000:365" is a white attribute "0", then the corresponding information may be represented as "0 1:0 2:121 100:12345678 5000:365".

The above representation method may also be directly indicated by an array, and a value at the nth position of the array is the value of the nth feature.

In step 204, the type of a compiler which compiles to generate a corresponding program is judged according to an entry instruction sequence of a known compiler, and a result of the coarse classification of the corresponding program may be determined according to the type of compiler, the type of file, the type of shelling, etc. Therein, the coarse classification may for example classify the inputted program into different categories, such as a driver file, VB, VC, DELPHI, UPX, UPACK, NSPACK, ASPACK, etc. according to the characteristics of file, the type of compiler and/or the type of shelling, etc., and then a targeted training may be performed.

In step 205, according to a result of the coarse classification, vector matrices of different categories are trained by using a preselected training model to generate a decision-making machine for identifying a malicious program.

Or, according to a result of the classification, vector matrices of different categories are trained by using a preselected decision-making machine to generate a training model for identifying a malicious program.

Figure 2B:
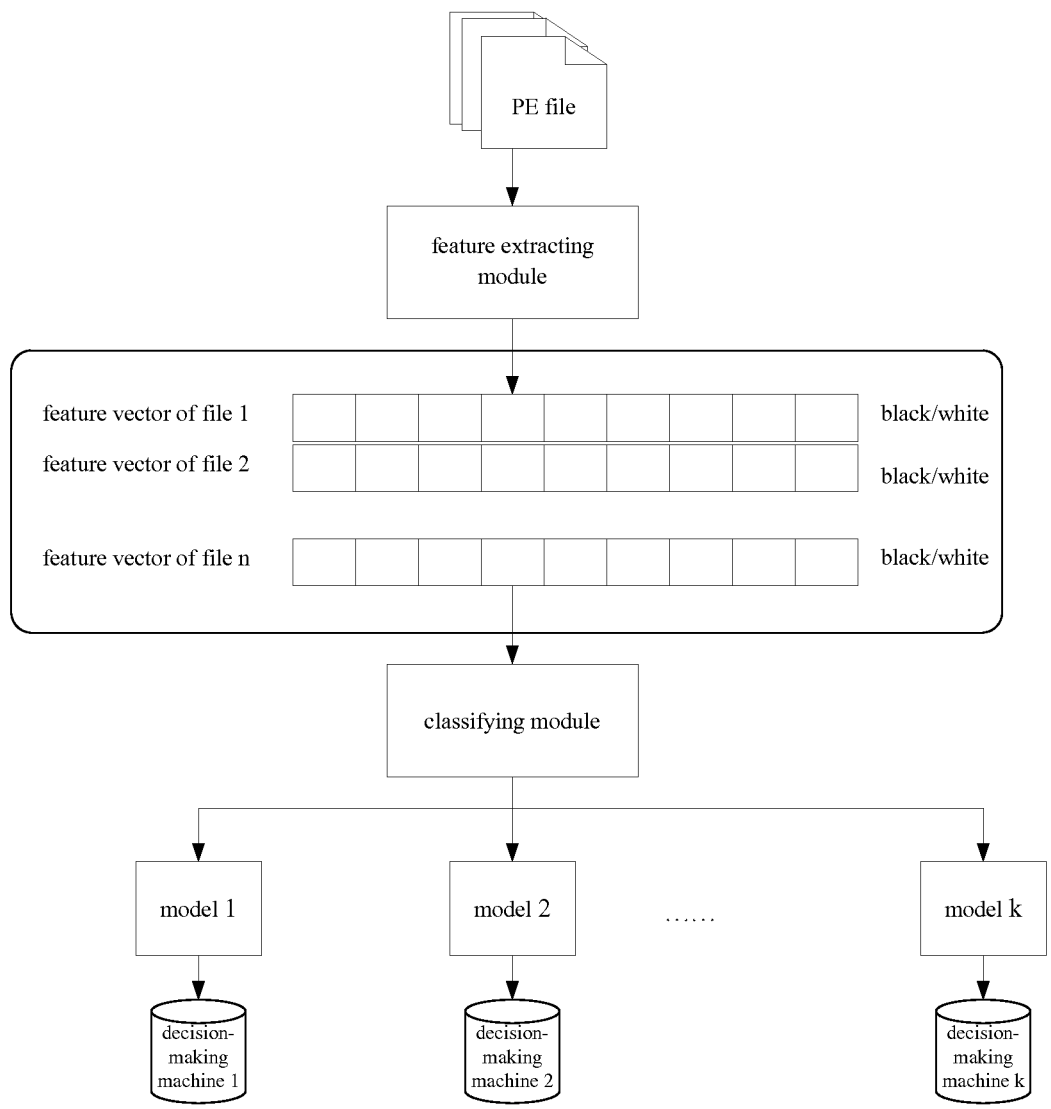
FIG. 2B is a schematic drawing of an application example of an embodiment of the application which identifies the type of a program.

Reference is made to FIG. 2B, which is a schematic drawing of an application example of an embodiment of the application which generates a decision-making machine identifying the type of a program.

Therein, a number of PE files are inputted massive executable program files which comprise malicious programs and non-malicious programs, and there are k decision-making machines and k training models corresponding to the k decision-making machines depending on differences between the feature classifications. After an executable program file is analyzed, corresponding features are extracted to generate a corresponding feature vector; according to the extracted features, a coarse classification of the features is performed, e.g., the features may be classified, according to a category of shelling, into UPX, NSPack, ASPack, UPack, PECompact, etc.; and according to a result of the coarse classification, feature vectors and black-and-white attributes of program files of different categories are trained by using different training models to obtain corresponding decision-making machines. When a coarse classification is performed in this embodiment, the type of a compiler which compiles to generate a corresponding program is judged according to an entry instruction sequence of a known compiler, and then a result of the coarse classification of the corresponding program is determined according to the type of compiler. The speed of such a method of coarse classification is quick, which only needs 16 steps of disassembly by statistics to achieve a good discrimination, with high accuracy and good generality, and in most cases it is not easily confused; and an expansion may be achieved for it.

A detailed procedure in which this example is applied to generate a decision-making machine identifying the type of a program is in accordance with the flow described in FIG. 2A, and will not be repeated herein.

Or, a number of PE files are inputted massive executable program files which comprise malicious programs and non-malicious programs, and there are k decision-making machines and k training models corresponding to the k decision-making machines depending on differences between the feature classifications. After an executable program file is analyzed, corresponding features are extracted and the extracted features are put into a corresponding feature vector; according to the extracted features, a classification of the features is performed, e.g., the features may be classified, according to a category of shelling, into UPX, NSPack, ASPack, UPack, PECompact, etc.; and according to a result of the classification, feature vectors and black-and-white attributes of program files of different categories are trained by using different decision-making machines to obtain corresponding training models. When a classification is performed in this embodiment, the type of a compiler which compiles to generate a corresponding program is judged according to an entry instruction sequence of a known compiler. The speed of such a method of classification is quick, which only needs 16 steps of disassembly by statistics to achieve a good discrimination, with high accuracy and good generality, and in most cases it is not easily confused; and an expansion may be achieved for it.

Figure 3:
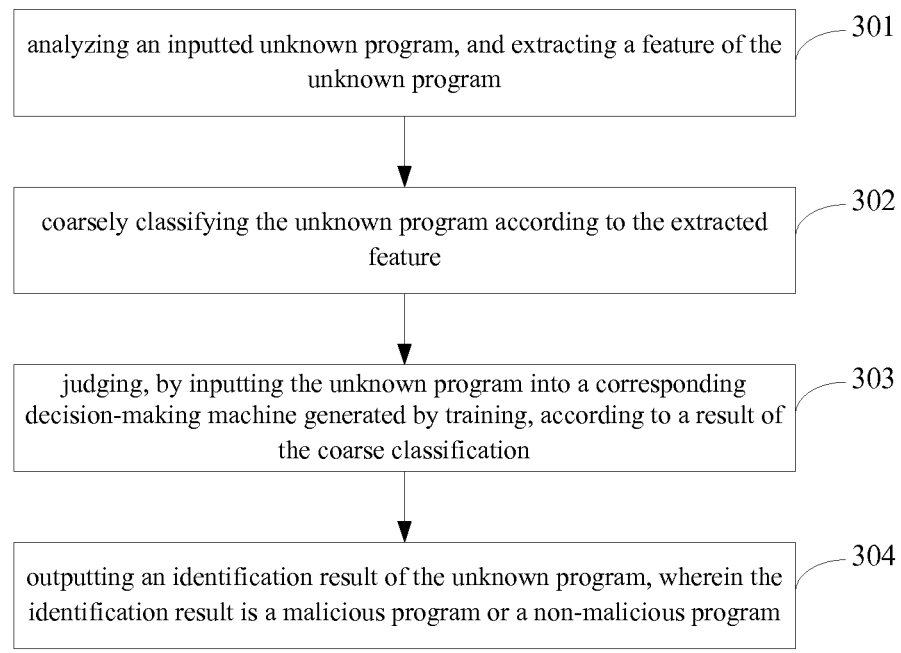
FIG. 3 is a flow chart of an embodiment of a method for program identification based on machine learning of the application.

Reference is made to FIG. 3, which is a flow chart of a first embodiment of a method for program identification based on machine learning of the application.

In step 301, an inputted unknown program is analyzed, and a feature of the unknown program is extracted.

In step 302, a coarse classification is performed for the unknown program according to the extracted feature.

Therein, the coarse classification may for example classify the unknown program into a different category, such as a driver file, VB, VC, DELPHI, UPX, UPACK, NSPACK, ASPACK, etc. according to the characteristics of file, the type of compiler and/or the type of shelling, etc., and then a targeted identification may be performed.

In step 303, a judgment is performed by inputting the unknown program into a corresponding decision-making machine generated by training according to a result of the coarse classification.

Or, a judgment is performed by inputting the unknown program into a generated training model and a corresponding decision-making machine according to a result of the coarse classification.

In step 304, an identification result of the unknown program is outputted, wherein the identification result is a malicious program or a non-malicious program.

Figure 4A:
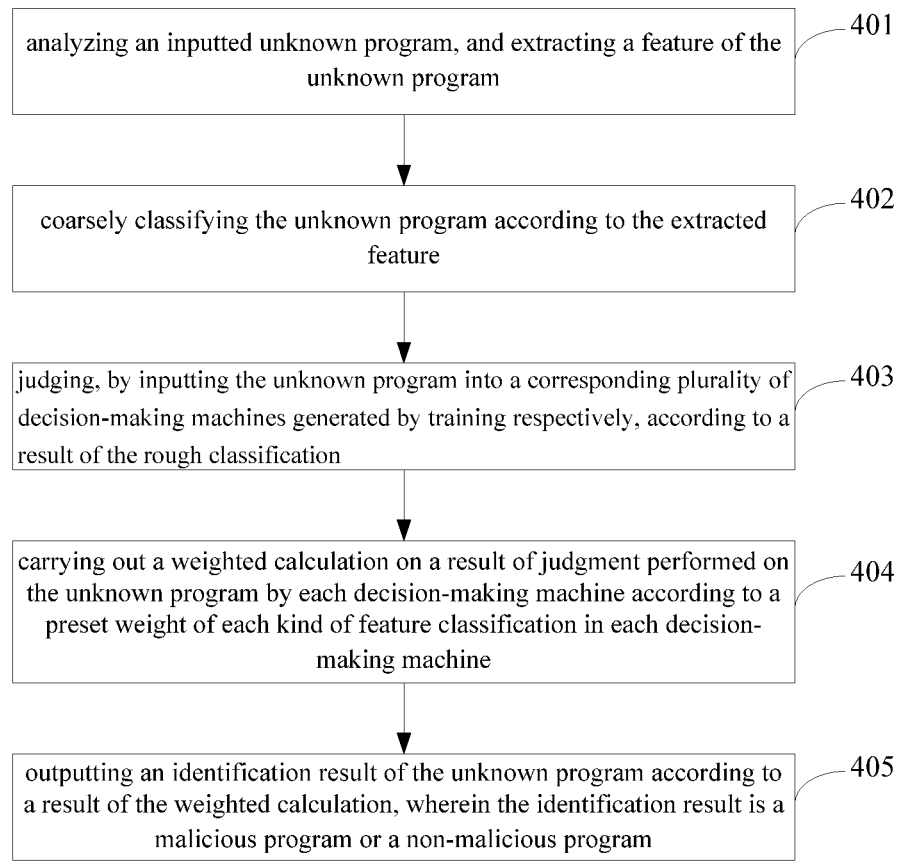
FIG. 4A is a flow chart of another embodiment of a method for program identification based on machine learning of the application.

Reference is made to FIG. 4A, which is a flow chart of a second embodiment of a method for identifying the type of a program of the application, and the embodiment shows an identification procedure when there are a plurality of decision-making machines.

In step 401, an inputted unknown program is analyzed, and a feature of the unknown program is extracted.

In step 402, a coarse classification is performed for the unknown program according to the extracted feature.

Therein, the coarse classification may for example classify the unknown program into a different category, such as a driver file, VB, VC, DELPHI, UPX, UPACK, NSPACK, ASPACK, etc. according to the characteristics of file, the type of compiler and/or the type of shelling, etc., and then a targeted identification may be performed.

In step 403, a judgment is performed by inputting the unknown program into a corresponding plurality of decision-making machines generated by training respectively according to a result of the coarse classification.

In step 404, a weighted calculation is carried out on results of judgment performed on the unknown program by each decision-making machine according to a preset weight of each kind of feature classification in each decision-making machine.

Or, a judgment is performed by inputting the unknown program into a plurality of generated training models and corresponding decision-making machines respectively according to a result of the coarse classification; a weighted calculation is carried out on results of judgment performed on the unknown program by each training model and its corresponding decision-making machine according to a preset weight of each kind of feature classification in each training model.

In step 405, an identification result of the unknown program is outputted according to a result of the weighted calculation, wherein the identification result is a malicious program or a non-malicious program.

Figure 4B:
FIG. 4B is a schematic drawing of an application example of an embodiment of the application which identifies the type of a program.

Reference is made to FIG. 4B, which is a schematic drawing of an application example of an embodiment of the application which identifies the type of a program.

Therein, assume that a PE file is the inputted unknown program file, and there are k decision-making machines and k training models corresponding to the k decision-making machines depending on the feature classifications. After the PE file is analyzed, corresponding features are extracted to generate a corresponding feature vector (or the extracted features are put into a corresponding feature vector); according to the extracted features, a coarse classification of the features is performed, e.g., the features may be classified, according to a category of shelling, into UPX, NSPack, ASPack, UPack, PECompact, etc., or may be classified, according to the type of compiler, into VC4, VC5, VC6, VC7, VC8, Delphi, BC, etc.; according to a result of the classification, a corresponding judgment is performed by using different decision-making machines (and training models); according to a judgment result obtained by a corresponding decision-making machine (and a model), a score result is obtained by weighing according to the weights of the classifications, and it is determined via the score result whether the file is a malicious program or a normal program.

For example, assuming that each kind of classification generates k decision-making machines by using K kinds of training models, there are totally m kinds of classifications, which are respectively classification 1, 2, ..., m, and a preset weight of the ith classification is $(w_{i1}, w_{i2}, \ldots, w_{ik})$, then a corresponding judgment result for the sample category i by the decision-making machines is $(r_{i1}, r_{i2}, \ldots, r_{ik})$, whereby a comprehensive result obtained is $(w_{i1}, w_{i2}, \ldots, w_{ik})*(r_{i1}, r_{i2}, \ldots, r_{ik})$. A result judgment threshold may be preset. When the judgment result is less than the threshold, the unknown program is determined as a non-malicious program; and when the judgment result is greater than the threshold, the unknown program is determined as a malicious program.

Or, assuming that there are totally k decision-making machines, there are totally m kinds of classifications, which are respectively classification 1, 2, ..., m, and a preset weight of the ith classification is $(w_{i1}, w_{i2}, \ldots, w_{ik})$, then a corresponding judgment result for the sample category i by the decision-making machines is $(r_{i1}, r_{i2}, \ldots, r_{ik})$, whereby a comprehensive result obtained is $(w_{i1}, w_{i2}, \ldots, w_{ik})*(r_{i1}, r_{i2}, \ldots, r_{ik})$. A result judgment threshold may be preset. When the judgment result is less than the threshold, the unknown program is determined as a non-malicious program; and when the judgment result is greater than the threshold, the unknown program is determined as a malicious program.

Corresponding to the above embodiment of a method for program identification based on machine learning of the application, the application further provides an embodiment of a device for program identification based on machine learning.

Figure 5:
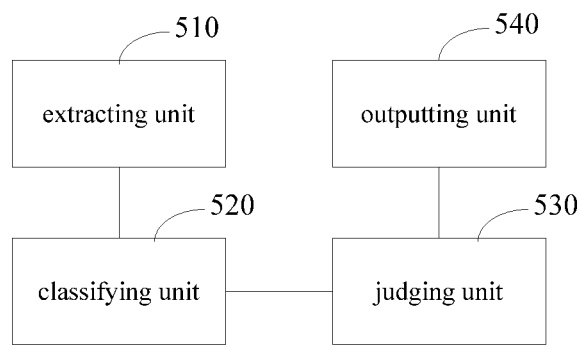
FIG. 5 is a block diagram of an embodiment of a device for program identification based on machine learning of the application.

Reference is made to FIG. 5, which is a block diagram of an embodiment of a device for program identification based on machine learning of the application.

The device comprises an extracting unit 510, a classifying unit 520, a judging unit 530 and an outputting unit 540.

Therein, the extracting unit 510 is adapted to analyzing an inputted unknown program, and extracting a feature of the unknown program;

the classifying unit 520 is adapted to coarsely classifying the unknown program according to the extracted feature;

the judging unit 530 is adapted to judging by inputting the unknown program into a generated training model and its corresponding decision-making machine according to a result of the coarse classification; and the outputting unit 540 is adapted to outputting an identification result of the unknown program, wherein the identification result is a malicious program or a non-malicious program.

In particular, the judging unit 530 may comprise (not shown in FIG. 5) a program inputting unit adapted to when a plurality of decision-making machines are included, judging by inputting the unknown program into a corresponding plurality of decision-making machines generated by training respectively; a weighted calculation unit adapted to carrying out a weighted calculation on results of judgment performed on the unknown program by each decision-making machine according to a preset weight of each kind of feature classification in each decision-making machine; said outputting unit 540 particularly adapted to outputting an identification result of the unknown program according to a result of the weighted calculation.

Or, the judging unit 530 may comprise (not shown in FIG. 5) a program inputting unit adapted to when a plurality of training models are included, judging by inputting the unknown program into a plurality of generated training models and corresponding decision-making machines respectively; a weighted calculation unit adapted to carrying out a weighted calculation on results of judgment performed on the unknown program by each training model and a corresponding decision-making machine according to a preset weight of each kind of feature classification in each training model; said outputting unit 540 particularly adapted to outputting an identification result of the unknown program according to a result of the weighted calculation.

Figure 6:
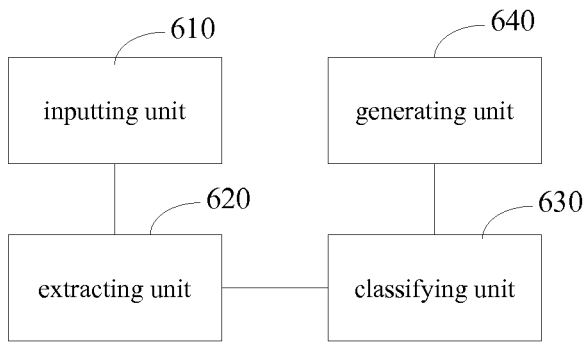
FIG. 6 is a block diagram of another embodiment of a device for program identification based on machine learning of the application.

Reference is made to FIG. 6, which is a block diagram of an embodiment of a device of the application when generating a decision-making machine identifying the type of a program.

The device comprises an inputting unit 610, an extracting unit 620, a classifying unit 630 and a generating unit 640.

Therein, the inputting unit 610 is adapted to inputting extracted massive programs, wherein the massive programs comprise malicious programs and non-malicious programs;

the extracting unit 620 is adapted to extracting a feature from each program inputted;

the classifying unit 630 is adapted to coarsely classifying the extracted feature;

the generating unit 640 is adapted to training, according to a result of the coarse classification, features of a different category by using a different training model to generate a decision-making machine or a set of decision-making machines for identifying a malicious program.

Or, the generating unit 640 is adapted to training, according to a result of the classification, features of a different category by using a different decision-making machine to generate a training model or a set of training models for identifying a malicious program.

In particular, the extracting unit 620 may comprise (not shown in FIG. 6):

a program file analyzing unit adapted to analyzing each program file and extracting a pre-defined feature from the program file; a vector attribute generating unit adapted to generating, from extracted features, a feature vector and a black-and-white attribute of each feature vector.

Therein, the coarse classification may for example classify the inputted program into a different category, such as a driver file, VB, VC, DELPHI, UPX, UPACK, NSPACK, ASPACK, etc. according to the characteristics of file, the type of compiler and/or the type of shelling, etc.

It can be seen from the description of the above implementations, the embodiments of the application, when identifying the type of an unknown program, extract a feature of the unknown program, classify the unknown program according to the extracted feature, judge by inputting the unknown program into a corresponding decision-making machine generated by training according to a result of the classification (or judge by inputting the unknown program into a generated training model and a corresponding decision-making machine), and output an identification result of the unknown program. The application adopts the machine learning technology, obtains a decision-making machine or model for identifying a malicious program by analyzing a large number of program samples, and can save a lot of manpower and improve the identification efficiency for a malicious program by using the decision-making machine or model; and furthermore, inherent laws of programs based on data mining for massive programs can be found, which can prevent a malicious program that has not happened and make it difficult for a malicious program to avoid being killed.

For better understanding and implementation of the technical solutions in the embodiments of the invention, in the following a description will be made in which utilizing a structural feature of a PE file, a class behavior characteristic, etc. in an unknown program to identify the unknown program is taken as an example. Of course, in a practical application, other features in an unknown program may be also utilized to identify whether the unknown program is a malicious program or a non-malicious program. By comparing these features, it can be identified whether the unknown program is a malicious program or a non-malicious program.

Figure 7:
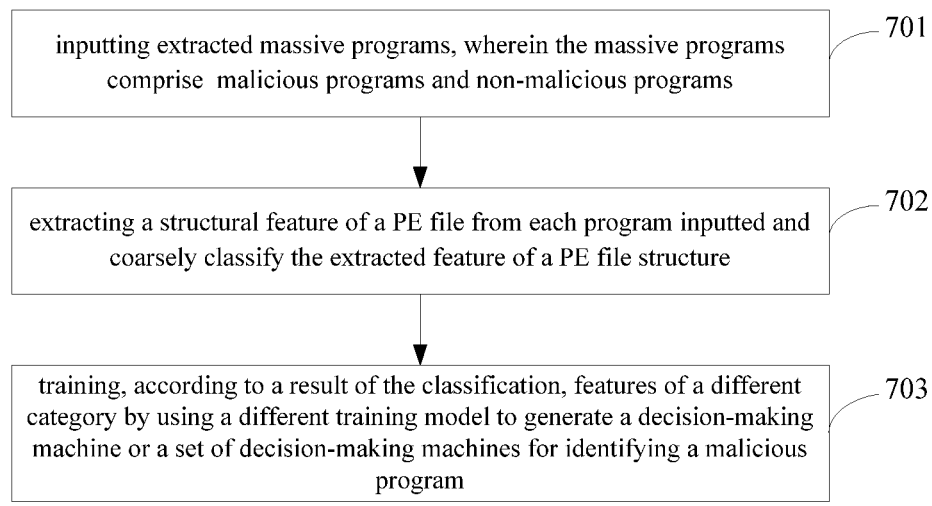
FIG. 7 is a flow chart of another embodiment of the application which generates a decision-making machine identifying the type of a program.

Reference is made to FIG. 7, which is a flow chart of another embodiment of the application which generates a decision-making machine identifying the type of a program.

In step 701, extracted massive programs are inputted, wherein the massive programs comprise malicious programs and non-malicious programs.

In step 702, a structural feature of a PE file is extracted from each program inputted and a coarse classification is performed for the extracted feature of a PE file structure.

In particular, each program file is analyzed and a predefined feature of a PE file structure is extracted from the program file; from extracted features of a PE file structure, a feature vector and a black-and-white attribute of each feature vector are generated.

The type of a compiler which compiles to generate a corresponding program is judged according to an entry instruction sequence of a known compiler, and a result of the coarse classification of the corresponding program may be determined according to the type of compiler, the type of file and/or the type of shelling, etc.

Therein, the coarse classification may for example classify the inputted program into a different category, such as a driver file, VB, VC, DELPHI, UPX, UPACK, NSPACK, ASPACK, etc. according to the characteristics of file, the type of compiler and/or the type of shelling, etc.

In the following, the PE file structure is particularly introduced. The PE file structure is a very complex structure, wherein some basic structures contain a large amount of PE information, and a structural feature of a PE file may be extracted based on the PE information.

In the embodiments of the application, a kind of commonly used PE basic structure is as follows:

```
IMAGE_FILE_HEADER STRUCT
    Machine                    WORD
    NumberOfSections           WORD
    TimeDateStamp              DWORD
    PointerToSymbolTable       DWORD
    NumberOfSymbols            DWORD
    SizeOfOptionalHeader       WORD
    Characteristics            WORD
IMAGE_FILE_HEADER ENDS
IMAGE_OPTIONAL_HEADER32 STRUCT
    Magic                      WORD
    MajorLinkerVersion         BYTE
    MinorLinkerVersion         BYTE
    SizeOfCode                 DWORD
    SizeOfInitializedData      DWORD
    SizeOfUninitializedData    DWORD
    AddressOfEntryPoint        DWORD
    BaseOfCode                 DWORD
    BaseOfData                 DWORD
    ImageBase                  DWORD
    SectionAlignment           DWORD
    FileAlignment              DWORD
```

-continued

```
    MajorOperatingSystemVersion    WORD
    MinorOperatingSystemVersion    WORD
    MajorImageVersion              WORD
    MinorImageVersion              WORD
    MajorSubsystemVersion          WORD
    MinorSubsystemVersion          WORD
    Win32VersionValue              DWORD
    SizeOfImage                    DWORD
    SizeOfHeaders                  DWORD
    CheckSum                       DWORD
    Subsystem                      WORD
    DllCharacteristics             WORD
    SizeOfStackReserve             DWORD
    SizeOfStackCommit              DWORD
    SizeOfHeapReserve              DWORD
    SizeOfHeapCommit               DWORD
    LoaderFlags                    DWORD
    NumberOfRvaAndSizes            DWORD
    DataDirectory    IMAGE_DATA_DIRECTORY 16 dup(< >)
IMAGE_OPTIONAL_HEADER32 ENDS
MAGE_DATA_DIRECTORY STRUCT
    VirtualAddress   DWORD
    isize            DWORD
IMAGE_DATA_DIRECTORY ENDS
IMAGE_SECTION_HEADER STRUCT
    Name1                   db    8 dup( )
    union Misc
        PhysicalAddress     dd
        VirtualSize         dd
    ends
    VirtualAddress          dd
    SizeOfRawData           dd
    PointerToRawData        dd
    PointerToRelocations    dd
    PointerToLinenumbers    dd
    NumberOfRelocations     dw
    NumberOfLinenumbers     dw
    Characteristics         dd
IMAGE_SECTION_HEADER ENDS
```

The above PE file basic structure contains lots of PE information. It can be seen by analyzing a large number of sample programs that, at the sub-level of the file structure of a PE file, there is a large difference between a normal program and a malicious program. From a data mining on the sample programs, a structural feature of a PE file that may be selected for the PE structure may comprise: a PE file header feature, a PE standard header feature, a PE optional header feature, a data directory feature, a commonly used section table feature, etc.

In the following, the above structural features of a PE file are introduced respectively.

1. the PE file header feature (IMAGE_FILE_HEADER), which particularly comprises the following features:
NumberOfSections
TimeDateStamp
Characteristics & IMAGE_FILE_RELOCS_STRIPPED
Characteristics & IMAGE_FILE_DLL
Characteristics & IMAGE_FILE_BYTES_REVERSED_LO
Characteristics & IMAGE_FILE_BYTES_REVERSED_HI
Characteristics & IMAGE_FILE_LOCAL_SYMS_STRIPPED
Characteristics & IMAGE_FILE_LINE_NUMS_STRIPPED
Characteristics & IMAGE_FILE_LARGE_ADDRESS_AWARE
Characteristics & IMAGE_FILE_NET_RUN_FROM_SWAP
Characteristics & IMAGE_FILE_REMOVABLE_RUN_FROM_SWAP
Characteristics & IMAGE_FILE_DEBUG_STRIPPED 2. the PE standard header feature (above BaseOfData of IMAGE_OPTIONAL_HEADER32), which particularly comprises the following features:
   MajorLinkerVersion
   MinorLinkerVersion
   SizeOfCode
   SizeOfInitializedData
   SizeOfUninitializedData
   AddressOfEntryPoint
   BaseOfCode
   BaseOfData 3. the PE optional header feature (IMAGE_OPTIONAL_HEADER32), which particularly comprises the following features:
   ImageBase
   SectionAlignment
   FileAlignment
   MajorOperatingSystemVersion
   MinorOperatingSystemVersion
   MajorImageVersion
   MinorImageVersion
   MajorSubsystemVersion
   MinorSubsystemVersion
   SizeOfImage
   SizeOfHeaders
   CheckSum
   Subsystem
   SizeOfStackReserve
   SizeOfStackCommit
   DllCharacteristics & MAGE_DLLCHARACTERISTICS_DYNAMIC_BASE
   DllCharacteristics & AGE_DLLCHARACTERISTICS_NO_ISOLATION
   DllCharacteristics & IMAGE_DLLCHARACTERISTICS_NO_SEH
   DllCharacteristics & IMAGE_DLLCHARACTERISTICS_WDM_DRIVER
   DllCharacteristics&IMAGE_DLLCHARACTERISTICS_TERMINAL_SERVER_AWARE 4. the data directory feature (IMAGE_OPTIONAL_HEADER32), which particularly comprises the following features:
   DataDirectory[IMAGE_DIRECTORY_ENTRY_EXPORT].Size
   DataDirectory[IMAGE_DIRECTORY_ENTRY_IMPORT].Size
   DataDirectory[IMAGE_DIRECTORY_ENTRY_RESOURCE].Size
   DataDirectory[IMAGE_DIRECTORY_ENTRY_SECURITY].Size
   DataDirectory[IMAGE_DIRECTORY_ENTRY_BASERELOC].Size
   DataDirectory[IMAGE_DIRECTORY_ENTRY_DEBUG].Size
   DataDirectory[IMAGE_DIRECTORY_ENTRY_TLS].Size
   DataDirectory[IMAGE_DIRECTORY_ENTRY_LOAD_CONFIG].Size
   DataDirectory[IMAGE_DIRECTORY_ENTRY_BOUND_IMPORT].Size
   DataDirectory[IMAGE_DIRECTORY_ENTRY_IAT].Size
   DataDirectory[IMAGE_DIRECTORY_ENTRY_DELAY_IMPORT].Size
   DataDirectory[IMAGE_DIRECTORY_ENTRY_COM_DESCRIPTOR].Size 5. the commonly used section table feature, which particularly comprises the following features:
   section table feature of a code section;
   section table feature of a data section;
   section table feature of a resource section;
   wherein the characteristics of each of the above section lists may be expanded bit by bit, and each expanded bit is taken as a feature.

In step 703, according to a result of the coarse classification, features of a different category are trained by using a different training model to generate a decision-making machine or a set of decision-making machines for identifying a malicious program.

Therein, a different decision-making machine may be trained by using the same or a different manner. For example, a decision-making machine may be trained by using a vector machine, or a decision-making machine may be trained by using a decision tree. The training model may be a training model with encoding, or a training model with compressing.

Or, according to a result of the classification, features of a different category are trained by using a different decision-making machine to generate a training model or a set of training models for identifying a malicious program. Therein, for a different decision-making machine, features are trained by using the same or a different manner comprising: training is performed by using a decision-making machine of a support vector machine, or training is performed by using a decision-making machine of a decision tree; the training model may be a training model with encoding, or a training model with compressing.

Figure 8:
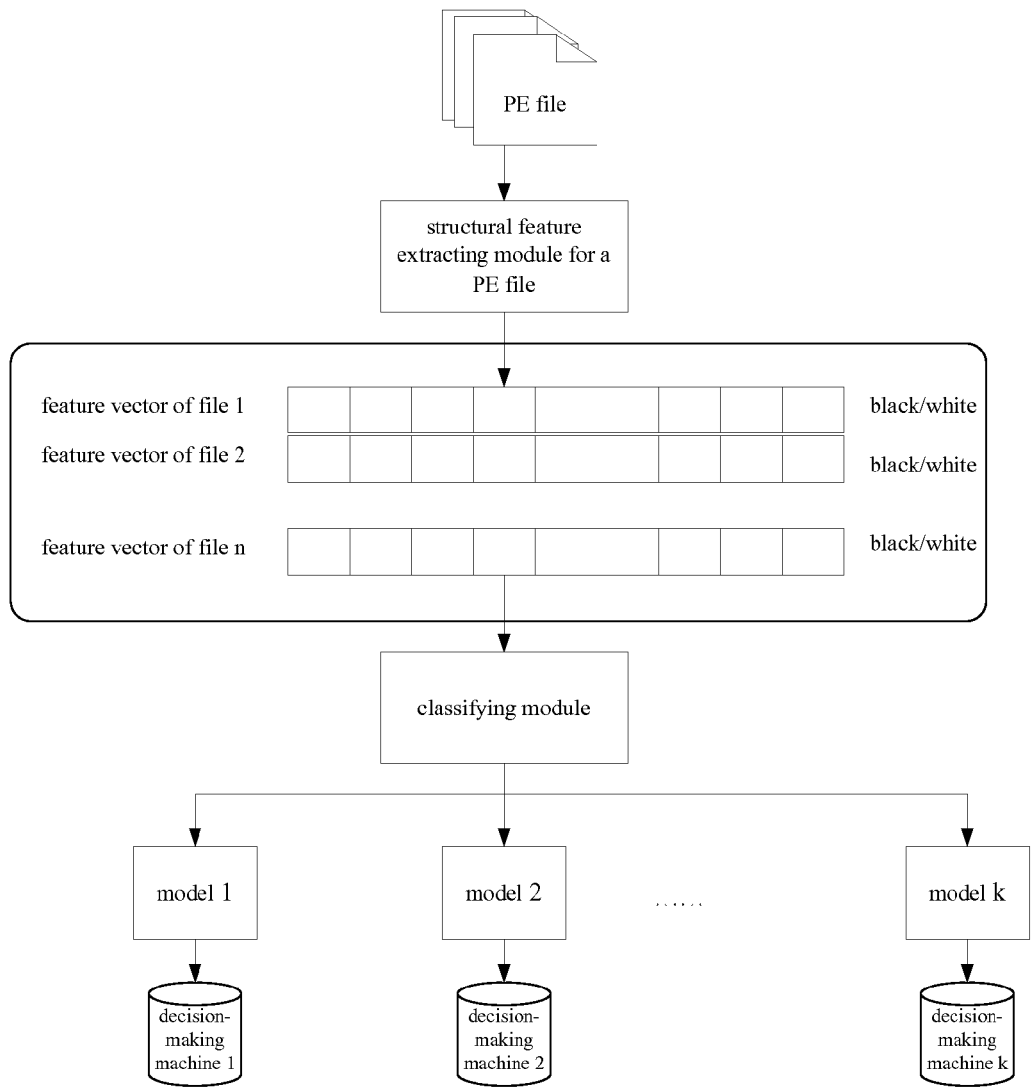
FIG. 8 is a schematic drawing of another application example of an embodiment of the application which generates a decision-making machine identifying the type of a program.

Reference is made to FIG. 8, which is a schematic drawing of an application example of an embodiment of the application which generates a decision-making machine identifying the type of a program.

Therein, a number of PE files are inputted massive executable program files which comprise malicious programs and non-malicious programs, and there are k decision-making machines and k training models corresponding to the k decision-making machines depending on the feature classifications of structural features of a PE file. After an executable program file is analyzed, corresponding structural features of a PE file are extracted to generate a corresponding feature vector (or the extracted structural features of a PE file are put into a corresponding feature vector); according to the extracted features, a coarse classification of the features is performed, e.g., the features may be classified, according to the description of the previous embodiment, into a PE file header feature classification, a PE standard header feature classification, a PE optional header feature classification, a data directory feature classification, a commonly used section table feature classification; and according to a result of the classification, feature vectors and black-and-white attributes of program files of different categories are trained by using different training models (or decision-making machines) to obtain corresponding decision-making machines (or training models).

By way of example, a different feature classification contains a different number of specific features. Taking the feature classification being a commonly used section table feature as an example, a section table feature which may be specifically included therein is: a section table feature of a code section, a section table feature of a data section, a section table feature of a resource section. In an embodiment of the application, each feature classification may be assigned a classification mark. For example, the classification mark for a commonly used section table feature is "1". For each specific commonly used section table feature, it may be further assigned a feature mark. For example, the feature mark for the section table feature of a code section is "1", the feature mark for the section table feature of a data section is "2", and the feature mark for the section table feature of a resource section is "3". When a feature vector is generated from extracted features, an array of each feature in the feature vector is characterized by its classification mark and feature mark. For example, if the extracted feature is a "section table feature of a code section" in a commonly used section table feature, its corresponding classification mark is "1", its feature mark is "1", and therefore the information corresponding to the "section table feature of a code section" in the feature vector may be represented as "1:1"; similarly, a specific feature belonging to other feature classification is also represented in the above form, and as shown in the following is an illustration of a feature vector of four features extracted from a program: 1:0 2:121 100:12345678 5000:365.

A black-and-white attribute of a feature vector is used for indicating whether a program containing the features in the feature vector belongs to a malicious program or a non-malicious program, wherein it corresponds to a non-malicious program if the attribute is "white", and it corresponds to a malicious program if the attribute is "black"; and furthermore, a mark may be defined as "0" for a white attribute, and a mark may be defined as "1" for a black attribute. Then, after a feature vector is generated for each program, it may be assigned an attribute mark according to the information contained in the feature vector. For example, if an attribute mark assigned to the above-mentioned feature vector "1:0 2:121 100:12345678 5000:365" is a white attribute "0", then the corresponding information may be represented as "0 1:0 2:121 100:12345678 5000:365". The above representation method may also be directly indicated by an array, and a value at the nth position of the array is the value of the nth feature.

Figure 9:
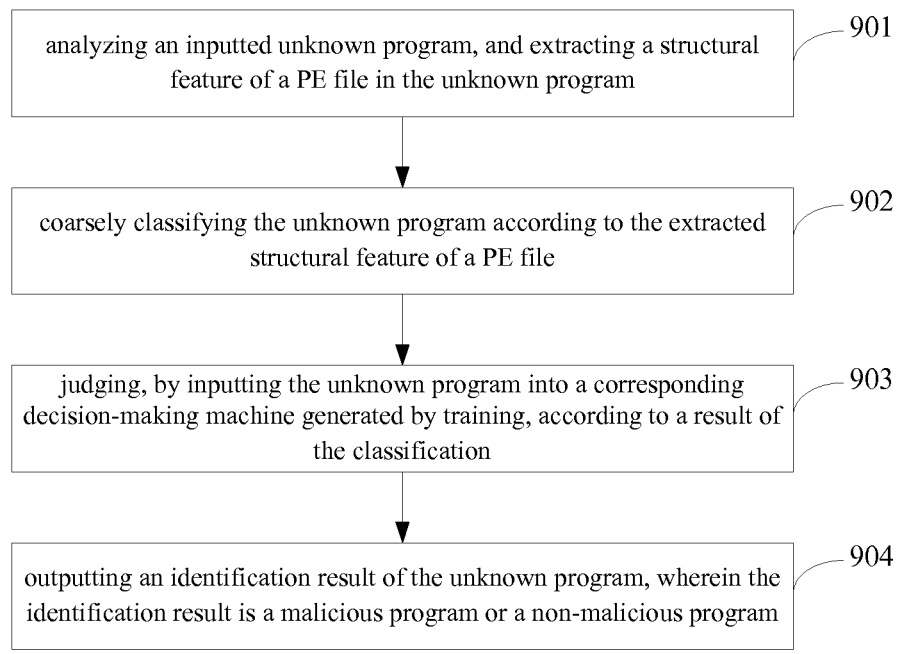
FIG. 9 is a flow chart of a further embodiment of a method for program identification based on machine learning of the application.

Reference is made to FIG. 9, which is a flow chart of an embodiment of a method for program identification based on machine learning of the application.

In step 901, an inputted unknown program is analyzed, and a structural feature of a PE file in the unknown program is extracted.

As can be seen from the description of the embodiment shown in FIG. 7, the structural feature of a PE file comprises at least one of the following features: a PE file header feature, a PE standard header feature, a PE optional header feature, a data directory feature, a commonly used section table feature.

In step 902, a coarse classification is performed for the unknown program according to the extracted structural feature of a PE file.

In step 903, a judgment is performed by inputting the unknown program into a corresponding decision-making machine generated by training according to a result of the coarse classification.

In particular, a judgment may be performed by inputting the unknown program into a corresponding plurality of decision-making machines generated by training respectively according to a result of the coarse classification; and a weighted calculation is carried out on results of judgment performed on the unknown program by each decision-making machine according to a preset weight of each kind of feature classification in each decision-making machine.

Or, a judgment is performed by inputting the unknown program into a generated training model and a corresponding decision-making machine according to a result of the coarse classification. In particular, a judgment may be performed by inputting the unknown program into a plurality of generated training models and corresponding decision-making machines respectively according to a result of the coarse classification; and a weighted calculation is carried out on results of judgment performed on the unknown program by each training model and its corresponding decision-making machine according to a preset weight of each kind of feature classification in each training model.

In step 904, an identification result of the unknown program is outputted, wherein the identification result is a malicious program or a non-malicious program.

In particular, an identification result of the unknown program is outputted according to a result of the weighted calculation, wherein the identification result is a malicious program or a non-malicious program.

Figure 10:
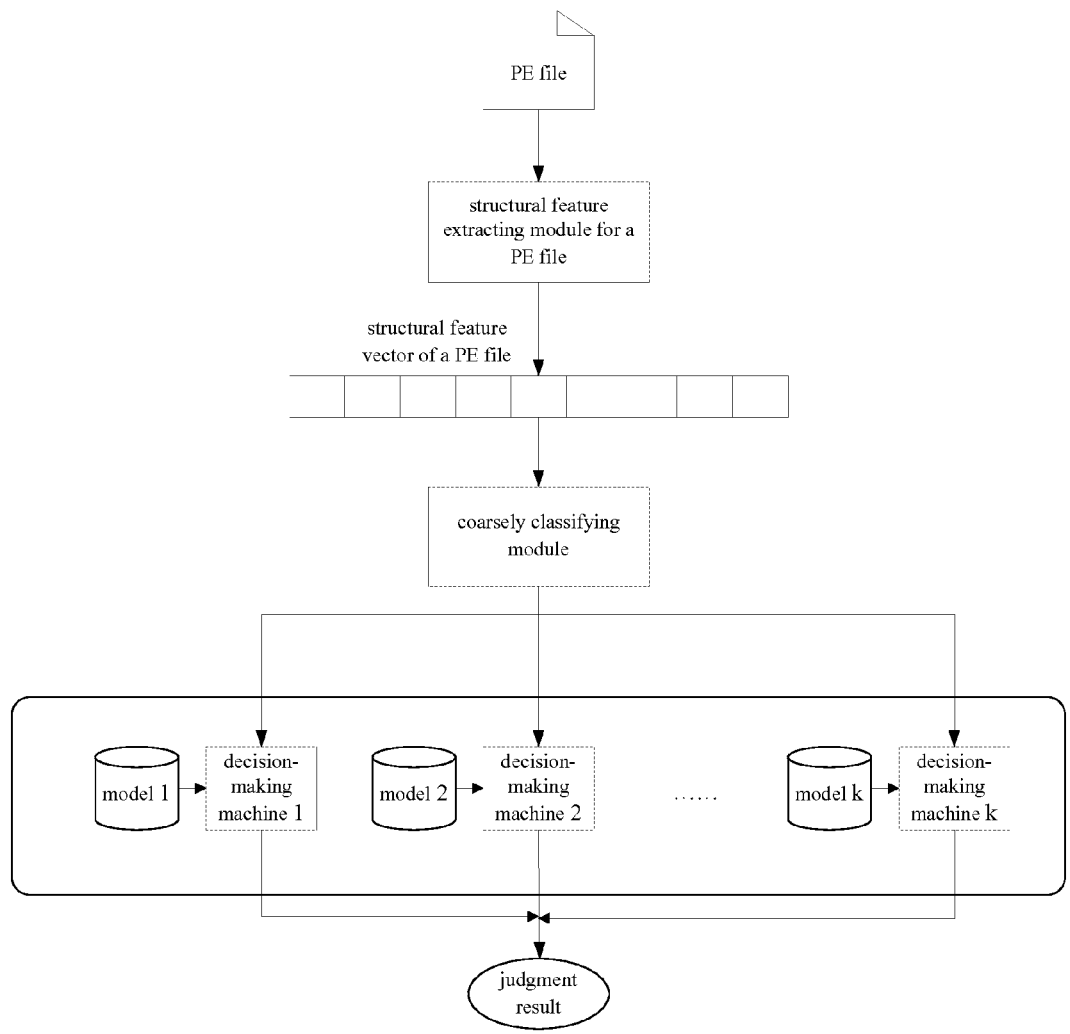
FIG. 10 is a schematic drawing of another application example of an embodiment of the application which identifies the type of a program.

Reference is made to FIG. 10, which is a schematic drawing of an application example of an embodiment of the application which identifies the type of a program.

Therein, assume that a PE file is the inputted unknown program file, and there are k decision-making machines and k training models corresponding to the k decision-making machines depending on the feature classifications. After the PE file is analyzed, corresponding structural features of the PE file are extracted to generate a corresponding feature vector (the extracted structural features of the PE file are put into a corresponding feature vector); according to the extracted structural features of the PE file, a classification of the features is performed, e.g., the features may be classified according to the feature classification of a commonly used section table feature into a section table feature of a code section, a section table feature of a data section, a section table feature of a resource section; according to a result of the coarse classification, a corresponding judgment is performed by using different decision-making machines (and training models); according to a judgment result obtained by a corresponding decision-making machine (and a model), a score result is obtained by weighing according to the weights of the classifications, and it is determined via the score result whether the file is a malicious program or a normal program.

For example, assuming that each kind of classification generates k decision-making machines by using K kinds of training models, there are totally m kinds of classifications, which are respectively classification 1, 2, . . . , m, and a preset weight of the ith classification is $(w_{i1}, w_{i2}, \ldots, w_{ik})$, then a corresponding judgment result for the sample category i by the decision-making machines is $(r_{i1}, r_{i2}, \ldots, r_{ik})$, whereby a comprehensive result obtained is $(w_{i1}, w_{i2}, \ldots, w_{ik})*(r_{i1}, r_{i2}, \ldots, r_{ik})$. A result judgment threshold may be preset. When the judgment result is less than the threshold, the unknown program is determined as a non-malicious program; and when the judgment result is greater than the threshold, the unknown program is determined as a malicious program.

Or, assuming that there are totally k decision-making machines, there are totally m kinds of classifications, which are respectively classification 1, 2, . . . , m, and a preset weight of the ith classification is $(w_{i1}, w_{i2}, \ldots, w_{ik})$, then a corresponding judgment result for the sample category i by the decision-making machines is $(r_{i1}, r_{i2}, \ldots, r_{ik})$, whereby a comprehensive result obtained is $(w_{i1}, \ldots, w_{i2}, \ldots, w_{ik})*(r_{i1}, r_{i2}, \ldots, r_{ik})$. A result judgment threshold may be preset. When the judgment result is less than the threshold, the unknown program is determined as a non-malicious program; and when the judgment result is greater than the threshold, the unknown program is determined as a malicious program.

Corresponding to the above embodiment of a method for program identification based on machine learning of the application, the application further provides an embodiment of a device for program identification based on machine learning.

Figure 11:
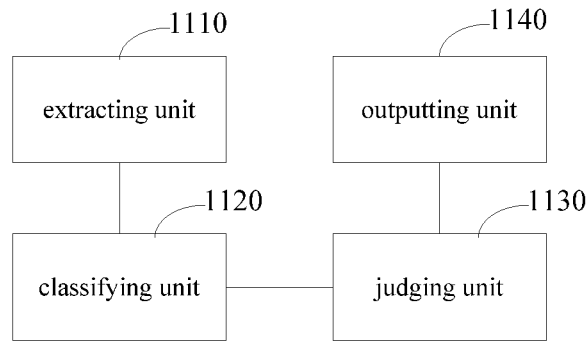
FIG. 11 is a block diagram of another embodiment of a device for program identification based on machine learning of the application.

Reference is made to FIG. 11, which is a block diagram of an embodiment of a device for program identification based on machine learning of the application.

The device comprises an extracting unit 1110, a classifying unit 1120, a judging unit 1130 and an outputting unit 1140.

Therein, the extracting unit 1110 is adapted to analyzing an inputted unknown program, and extracting a structural feature of a PE file in the unknown program;

the classifying unit 1120 is adapted to coarsely classifying the unknown program according to the extracted structural feature of a PE file;

the judging unit 1130 is adapted to judging by inputting the unknown program into a corresponding decision-making machine generated by training according to a result of the coarse classification;

or, the judging unit 1130 is adapted to judging by inputting the unknown program into a generated training model and its corresponding decision-making machine according to a result of the coarse classification; and the outputting unit 1140 is adapted to outputting an identification result of the unknown program, wherein the identification result is a malicious program or a non-malicious program.

Therein, the extracting unit 1110 is particularly adapted to extracting at least one of the following features in the unknown program: a PE file header feature, a PE standard header feature, a PE optional header feature, a data directory feature, a commonly used section table feature.

In particular, the judging unit 1130 may comprise (not shown in FIG. 11):

a program inputting unit adapted to when a plurality of decision-making machines are included, judging by inputting the unknown program into a corresponding plurality of decision-making machines generated by training respectively; a weighted calculation unit adapted to carrying out a weighted calculation on results of judgment performed on the unknown program by each decision-making machine according to a preset weight of each kind of structural feature classification of a PE file in each decision-making machine; said outputting unit 1140 particularly adapted to outputting an identification result of the unknown program according to a result of the weighted calculation.

Or, the judging unit 1130 may comprise (not shown in FIG. 11) a program inputting unit adapted to when a plurality of training models are included, judging by inputting the unknown program into a plurality of generated training models and corresponding decision-making machines respectively; a weighted calculation unit adapted to carrying out a weighted calculation on results of judgment performed on the unknown program by each training model and a corresponding decision-making machine according to a preset weight of each kind of structural feature classification of a PE file in each training model; said outputting unit 1140 particularly adapted to outputting an identification result of the unknown program according to a result of the weighted calculation.

Figure 12:
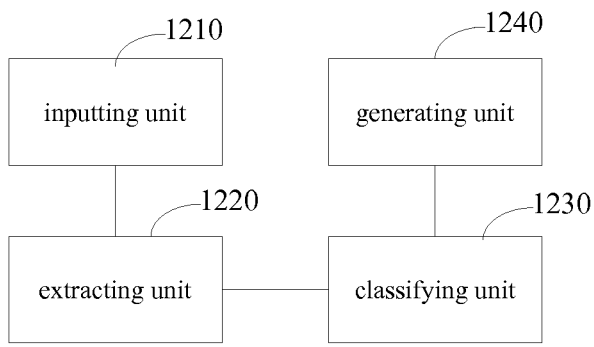
FIG. 12 is a block diagram of a further embodiment of a device for program identification based on machine learning of the application.

Reference is made to FIG. 12, which is a block diagram of a further embodiment of a device for program identification based on machine learning of the application, which device for program identification further has the function of generating a decision-making machine identifying the type of a program in comparison with FIG. 11.

The device comprises an inputting unit 1210, an extracting unit 1220, a classifying unit 1230 and a generating unit 1240.

Therein, the inputting unit 1210 is adapted to inputting extracted massive programs, wherein the massive programs comprise malicious programs and non-malicious programs;

the extracting unit 1220 is adapted to extracting a structural feature of a PE file from each program inputted;

the classifying unit 1230 is adapted to coarsely classifying the extracted structural feature of a PE file;

the generating unit 1240 is adapted to training, according to a result of the classification, structural features of a PE file of a different category by using a different training model to generate a decision-making machine or a set of decision-making machines for identifying a malicious program.

Or, the generating unit 1240 is adapted to training, according to a result of the classification, structural features of a PE file of a different category by using a different decision-making machine to generate a training model or a set of training models for identifying a malicious program.

In particular, the extracting unit 1220 may comprise (not shown in FIG. 12):

a structural feature extracting unit adapted to analyzing each program file and extracting a pre-defined structural feature of a PE file from the program file; a vector attribute generating unit adapted to generating, from extracted structural features of a PE file, a feature vector and a black-and-white attribute of each feature vector.

In particular, the classifying unit 1230 is adapted to judging the type of a compiler which compiles to generate a corresponding program according to an entry instruction sequence of a known compiler. A result of the coarse classification of the corresponding program may be determined according to the type of compiler, the type of file and/or the type of shelling, etc.

Therein, the coarse classification may for example classify the inputted program into a different category, such as a driver file, VB, VC, DELPHI, UPX, UPACK, NSPACK, ASPACK, etc. according to the characteristics of file, the type of compiler and/or the type of shelling, etc.

It can be seen from the description of the above implementations, the embodiments of the application, when identifying the type of an unknown program based on a structural feature of a PE file, analyze the inputted unknown program, extract a structural feature of a PE file in the unknown program, coarsely classify the unknown program according to the extracted structural feature of a PE file, judge by inputting the unknown program into a corresponding decision-making machine generated by training according to a result of the coarse classification (or judge by inputting the unknown program into a generated training model and a corresponding decision-making machine), and output an identification result of the unknown program. The application adopts the machine learning technology, obtains a decision-making machine or model based on a structural feature of a PE file for identifying a malicious program by extracting and analyzing a structural feature of a PE file for a large number of program samples, and can save a lot of manpower and improve the identification efficiency for a malicious program by using the decision-making machine or model; and furthermore, based on data mining for massive programs, can find an inherent law of programs based on a structural feature of a PE file, prevent a malicious program that has not happened and make it difficult for a malicious program to avoid being killed.

Figure 13:
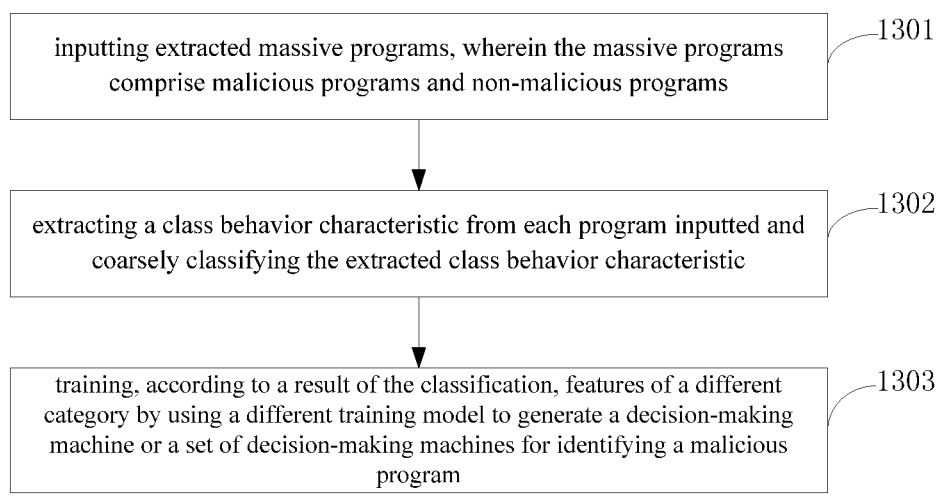
FIG. 13 is a flow chart of a further embodiment of the application which generates a decision-making machine identifying the type of a program.

Reference is made to FIG. 13, which is a flow chart of a further embodiment of the application which generates a model identifying the type of a program.

In step 1301, extracted massive programs are inputted, wherein the massive programs comprise malicious programs and non-malicious programs.

In step 1302, a class behavior characteristic is extracted from each program inputted and a coarse classification is performed for the extracted class behavior characteristic.

In particular, each program file is analyzed and a predefined class behavior characteristic is extracted from the program file; from extracted class behavior characteristics, a feature vector and a black-and-white attribute of each feature vector are generated.

The type of a compiler which compiles to generate a corresponding program is judged according to an entry instruction sequence of a known compiler, and a result of the coarse classification of the corresponding program may be determined according to the type of compiler, the type of file and/or the type of shelling, etc.

Therein, the coarse classification may for example classify the inputted program into a different category, such as a driver file, VB, VC, DELPHI, UPX, UPACK, NSPACK, ASPACK, etc. according to the characteristics of file, the type of compiler and/or the type of shelling, etc.

In the following, a class behavior characteristic in an embodiment of the application will be particularly introduced, wherein the class behavior characteristic may be divided on the whole into an import table library feature and an API (application programming interface) feature of an import table, which are described respectively as follows.

1. the import table library feature

A dynamic library imported into an import table generally has a specific functionality, and can indicate functions that may be achieved by a program. For example, programs of the library WS2_32.DLL of an import table generally indicate that networking operations are needed. Therefore, several dynamic libraries used by common malicious programs may be preselected by examining the names of import libraries of an import table. In particular, a HASH table may be established for these dynamic libraries, namely, after the feature strings of the selected dynamic libraries are normalized, a HASH value is calculated, and a HASH table is established according to the calculated HASH values. Subsequently, for an inputted unknown program, it may be that after its import table is extracted, the HASH table is searched to determine features of the import table in order to achieve the goal of determining whether it is a malicious program.

By way of example, a class feature of a library of the import table may be further subdivided into the following types:

1) the class feature of network (including RPC), examples of which are as follows:
DNSAPI.DLL
MSWSOCK.DLL
NDIS.SYS
NETAPI32.DLL
WININET.DLL
WSOCK32.DLL
WS2_32.DLL
MPR.DLL
RPCRT4.DLL
URLMON.DLL 2) the class feature of advanced WIN32 application programming interface, examples of which are as follows:
ADVAPI32.DLL 3) the class feature of system kernel, examples of which are as follows:
KERNEL32.DLL
NTDLL.DLL
NTOSKRNL.EXE 4) the class feature of application programming interface related to a Windows user interface, examples of which are as follows:
USER32.DLL 5) the class feature of GUI graphical user interface module shared by Windows application programs, examples of which are as follows:
COMCTL32.DLL
GDI32.DLL
GDIPLUS.DLL 6) the class feature of Windows hardware abstraction layer module, examples of which are as follows:
HAL.DLL 7) the class feature of Microsoft MCF Library, examples of which are as follows:
MFC42.DLL 8) the class feature of Microsoft Visual Basic virtual machine related module, examples of which are as follows:
MSVBVM60.DLL 9) the class feature of standard C runtime library program, examples of which are as follows:
MSVCP60.DLL
MSVCR71.DLL
MSVCRT.DLL 10) the class feature of object linking and embedding related module, examples of which are as follows:
OLE32.DLL
OLEAUT32.DLL 11) the class feature of Windows system process state supporting module, examples of which are as follows:
PSAPI.DLL 12) the class feature of 32-bit Windows shell dynamic link library file, examples of which are as follows:
SHELL32.DLL 13) the class feature of UNC and URL address dynamic link library file for registry key values and color settings, examples of which are as follows:
SHLWAPI.DLL 2. the API feature of an import table The API feature of an import table is a function feature selected from a library of the import table, and the functions may further describe the behavioral functions of a program. A particular normalized format is as follows:
DLLNAME!APINAME
DLLNAME is uniformly converted into uppercase, e.g., ADVAPI32.DLL!AddAccessAllowedAce.

For the class feature of advanced WIN32 application programming interface, ADVAPI32.DLL, examples of its function features that may be further selected are as follows:
ADVAPI32.DLL!AddAccessAllowedAce
ADVAPI32.DLL!AddAce
ADVAPI32.DLL!AdjustTokenPrivileges
ADVAPI32.DLL!AllocateAndInitializeSid
ADVAPI32.DLL!ChangeServiceConfig2A
ADVAPI32.DLL!ChangeServiceConfig2W
ADVAPI32.DLL!CheckTokenMembership
ADVAPI32.DLL!CloseServiceHandle
ADVAPI32.DLL!ControlService
ADVAPI32.DLL!ConvertSidToStringSidW Taking another example, for the class feature of GUI graphical user interface module shared by Windows application programs, COMCTL32.DLL, examples of its function features that may be further selected are as follows:
COMCTL32.DLL!13
COMCTL32.DLL!14
COMCTL32.DLL!17
COMCTL32.DLL!CreatePropertySheetPageA
COMCTL32.DLL!DestroyPropertySheetPage
COMCTL32.DLL!FlatSB_GetScrollInfo
COMCTL32.DLL!FlatSB_SetScrollInfo
COMCTL32.DLL!FlatSB_SetScrollPos
COMCTL32.DLL!ImageList_Add
COMCTL32.DLL!ImageList_AddMasked The above is just an exemplary description. Those function features corresponding to each particular import table library feature will not be enumerated any more.

For the above-mentioned function features, a HASH table may also be established for them. After the selected function feature strings are normalized, a HASH value is calculated, and a HASH table is established according to the calculated HASH values. Subsequently, for an inputted unknown program, it may be that after the API function features of its import table are extracted, the HASH table is searched to achieve the goal of determining whether it is a malicious program.

In step 1303, according to a result of the classification, features of a different category are trained by using a different training model to generate a decision-making machine or a set of decision-making machines for identifying a malicious program.

Therein, a different decision-making machine may be trained by using the same or a different manner. For example, a decision-making machine may be trained by using a vector machine, or a decision-making machine may be trained by using a decision tree. The training model may be a training model with encoding, or a training model with compressing.

Or, according to a result of the classification, features of a different category are trained by using a different decision-making machine to generate a training model or a set of training models for identifying a malicious program. Therein, for a different decision-making machine, features are trained by using the same or a different manner comprising: training is performed by using a decision-making machine of a support vector machine, or training is performed by using a decision-making machine of a decision tree; the training model may be a training model with encoding, or a training model with compressing.

Figure 14:
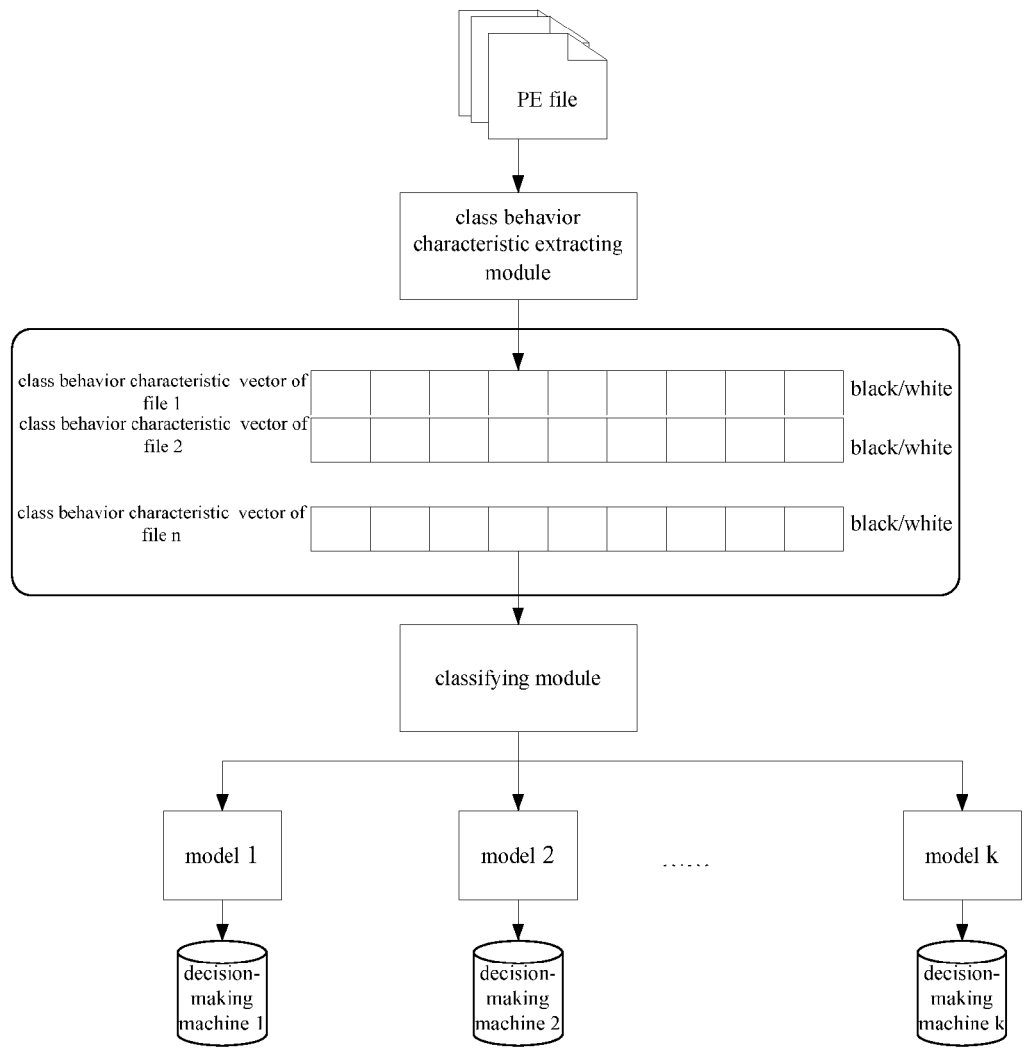
FIG. 14 is a schematic drawing of a further application example of an embodiment of the application which generates a decision-making machine identifying the type of a program.

Reference is made to FIG. 14, which is a schematic drawing of an application example of an embodiment of the application which generates a decision-making machine identifying the type of a program.

Therein, a number of PE files are inputted massive executable program files which comprise malicious programs and non-malicious programs, and there are k decision-making machines and k training models corresponding to the k decision-making machines depending on the feature classifications of class behaviors. After an executable program file is analyzed, corresponding class behavior characteristics are extracted to generate a corresponding feature vector (or the extracted class behavior characteristics are put into a corresponding feature vector); according to the extracted features, a classification of the features is performed, e.g., the features may be classified, for example, according to the description of an import table library feature in the previous embodiment into a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; and according to a result of the classification, feature vectors and black-and-white attributes of program files of different categories are trained by using different training models (or decision-making machines) to obtain a corresponding decision-making machine (or training model).

By way of example, a different feature classification contains a different number of specific features. Taking the feature classification being a class feature of network as an example, the class feature of network which may be specifically included therein is: DNSAPI.DLL, MSWSOCK.DLL, NDIS.SYS, NETAPI32.DLL, WININET.DLL, WSOCK32.DLL, WS2_32.DLL, MPR.DLL, RPCRT4.DLL, URLMON.DLL, etc. In an embodiment of the application, each feature classification may be assigned a classification mark. For example, the classification mark for a class feature of network is "1". For each specific class feature of network, it may be further assigned a feature mark. For example, the feature mark for the dynamic library DNSAPI.DLL is "1", the feature mark for the dynamic library MSWSOCK.DLL is "2", and the feature mark for the dynamic library NETAPI32.DLL is "3". When a feature vector is generated from extracted features, an array of each feature in the feature vector is characterized by its classification mark and feature mark. For example, if the extracted feature is the "dynamic library DNSAPI.DLL" in a commonly used section table feature, its corresponding classification mark is "1", its feature mark is "1", and therefore the information corresponding to the "section table feature of a code section" in the feature vector may be represented as "1:1"; similarly, a specific feature belonging to other feature classification is also represented in the above form, and as shown in the following is an illustration of a feature vector of four features extracted from a program: 1:0 2:121 100:12345678 5000:365.

A black-and-white attribute of a feature vector is used for indicating whether a program containing the features in the feature vector belongs to a malicious program or a non-malicious program, wherein it corresponds to a non-malicious program if the attribute is "white", and it corresponds to a malicious program if the attribute is "black"; and furthermore, a mark may be defined as "0" for a white attribute, and a mark may be defined as "1" for a black attribute. Then, after a feature vector is generated for each program, it may be assigned an attribute mark according to the information contained in the feature vector. For example, if an attribute mark assigned to the above-mentioned feature vector "1:0 2:121 100:12345678 5000:365" is a white attribute "0", then the corresponding information may be represented as "0 1:0 2:121 100:12345678 5000:365". The above representation method may also be directly indicated by an array, and a value at the nth position of the array is the value of the nth feature.

Figure 15:
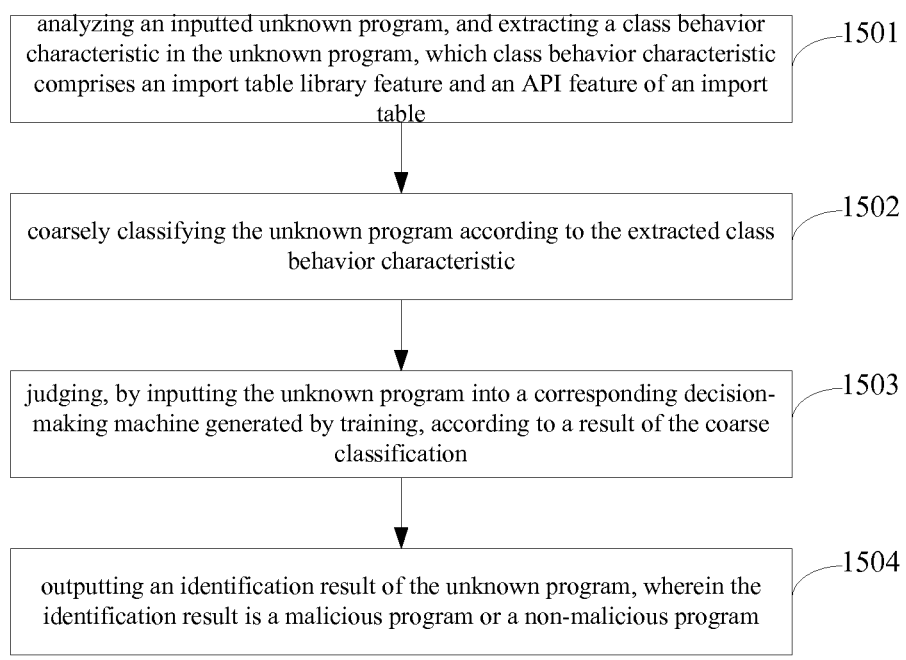
FIG. 15 is a flow chart of a further embodiment of a method for program identification based on machine learning of the application.

Reference is made to FIG. 15, which is a flow chart of a further embodiment of a method for program identification based on machine learning of the application.

In step 1501, an inputted unknown program is analyzed, and a class behavior characteristic in the unknown program is extracted, which class behavior characteristic comprises an import table library feature and an API feature of an import table.

As can be seen from the description of the embodiment shown in FIG. 13, the import table library feature comprises a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; whereas the API feature of an import table is a function feature selected from a library of the import table.

In step 1502, a coarse classification is performed for the unknown program according to the extracted class behavior characteristic.

In step 1503, a judgment is performed by inputting the unknown program into a corresponding decision-making machine generated by training according to a result of the coarse classification.

In particular, a judgment may be performed by inputting the unknown program into a corresponding plurality of decision-making machines generated by training respectively according to a result of the coarse classification; and a weighted calculation is carried out on results of judgment performed on the unknown program by each decision-making machine according to a preset weight of each kind of feature classification in each decision-making machine.

Or, a judgment is performed by inputting the unknown program into a generated training model and a corresponding decision-making machine according to a result of the coarse classification. In particular, a judgment may be performed by inputting the unknown program into a plurality of generated training models and corresponding decision-making machines respectively according to a result of the coarse classification; and a weighted calculation is carried out on a result of judgment performed on the unknown program by each training model and its corresponding decision-making machine according to a preset weight of each kind of feature classification in each training model.

In step 1504, an identification result of the unknown program is outputted, wherein the identification result is a malicious program or a non-malicious program.

In particular, an identification result of the unknown program is outputted according to a result of the weighted calculation, wherein the identification result is a malicious program or a non-malicious program.

Figure 16:
FIG. 16 is a schematic drawing of a further application example of an embodiment of the application which identifies the type of a program.

Reference is made to FIG. 16, which is a schematic drawing of an application example of an embodiment of the application which identifies the type of a program.

Therein, assume that a PE file is the inputted unknown program file, and there are k decision-making machines and k training models corresponding to the k decision-making machines depending on the feature classifications. After the PE file is analyzed, corresponding class behavior characteristics are extracted to generate a corresponding feature vector (the extracted class behavior characteristics are put into a corresponding feature vector); according to the extracted class behavior characteristics, a classification of the features is performed, e.g., the features may be classified according to the class feature of a library of an import table a into a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file, etc.; according to a result of the classification, a corresponding judgment is performed by using different decision-making machines (and training models); according to a judgment result obtained by a corresponding decision-making machine (and a model), a score result is obtained by weighing according to the weights of the classifications, and it is determined via the score result whether the file is a malicious program or a normal program.

For the inputted unknown program, when a corresponding judgment is performed by using different decision-making machines (and training models) according to a result of the classification, the initial black-and-white attribute values of all the class behavior characteristics may be set to 0; after class behavior characteristics are extracted from the unknown program, these class behavior characteristics are normalized, and searched in an established HASH table above mentioned; and if a corresponding feature is found, its black-and-white attribute value is set from 0 to 1, otherwise, no processing is performed.

When a score result is obtained by weighing according to the weights of the classifications, assuming that each kind of classification generates k decision-making machines by using K kinds of training models, there are totally m kinds of classifications, which are respectively classification 1, 2, . . . , m, and a preset weight of the ith classification is ($w_{i1}$, $w_{i2}$, . . . , $w_{ik}$), then a corresponding judgment result for the sample category i by the decision-making machines is ($r_{i1}$, $r_{i2}$, . . . , $r_{ik}$), whereby a comprehensive result obtained is ($w_{i1}$, $w_{i2}$, . . . , $w_{ik}$)*($r_{i1}$, $r_{i2}$, . . . , $r_{ik}$). A result judgment threshold may be preset. When the judgment result is less than the threshold, the unknown program is determined as a non-malicious program; and when the judgment result is greater than the threshold, the unknown program is determined as a malicious program.

Or, when a score result is obtained by weighing according to the weights of the classifications, assuming that there are totally k decision-making machines, and there are totally m kinds of classifications, which are respectively classification 1, 2, . . . , m, and a preset weight of the ith classification is ($w_{i1}$, $w_{i2}$, . . . , $w_{ik}$), then a corresponding judgment result for the sample category i by the decision-making machines is ($r_{i1}$, $r_{i2}$, . . . , $r_{ik}$), whereby a comprehensive result obtained is ($w_{i1}$, $w_{i2}$, . . . , $w_{ik}$)*($r_{i1}$, $r_{i2}$, . . . , $r_{ik}$). A result judgment threshold may be preset. When the judgment result is less than the threshold, the unknown program is determined as a non-malicious program; and when the judgment result is greater than the threshold, the unknown program is determined as a malicious program.

Corresponding to the above embodiment of a method for program identification based on machine learning of the application, the application further provides an embodiment of a device for program identification based on machine learning.

Figure 17:
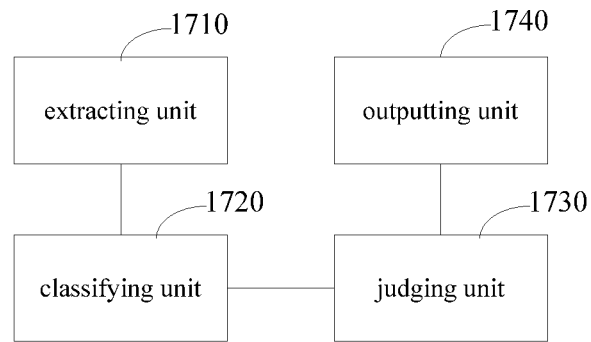
FIG. 17 is a block diagram of a further embodiment of a device for program identification based on machine learning of the application.

Reference is made to FIG. 17, which is a block diagram of a further embodiment of a device for program identification based on machine learning of the application.

The device comprises an extracting unit 1710, a classifying unit 1720, a judging unit 1730 and an outputting unit 1740.

Therein, the extracting unit 1710 is adapted to analyzing an inputted unknown program, and extracting a class behavior characteristic in the unknown program, which class behavior characteristic comprises an import table library feature and an application programming interface API feature of an import table;

the classifying unit 1720 is adapted to coarsely classifying the unknown program according to the extracted class behavior characteristic;

the judging unit 1730 is adapted to judging by inputting the unknown program into a corresponding decision-making machine generated by training according to a result of the coarse classification or, the judging unit 1730 is adapted to judging by inputting the unknown program into a generated training model and its corresponding decision-making machine according to a result of the coarse classification; and the outputting unit 1740 is adapted to outputting an identification result of the unknown program, wherein the identification result is a malicious program or a non-malicious program.

Therein, the extracting unit 1710 is particularly adapted to extracting an import table library feature and an API feature of an import table in the unknown program. The import table library feature comprises: a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; the API feature of an import table is a function feature selected from a library of the import table.

In particular, the judging unit 1730 may comprise (not shown in FIG. 17):

either a program inputting unit adapted to r when a plurality of decision-making machines are included, judging by inputting the unknown program into a corresponding plurality of decision-making machines generated by training respectively; a weighted calculation unit adapted to carrying out a weighted calculation on results of judgment performed on the unknown program by each decision-making machine according to a preset weight of each kind of class behavior characteristic classification in each decision-making machine; said outputting unit 1740 particularly adapted to outputting an identification result of the unknown program according to a result of the weighted calculation.

Or, the judging unit 1730 may comprise (not shown in FIG. 17) a program inputting unit adapted to when a plurality of training models are included, judging by inputting the unknown program into a plurality of generated training models and corresponding decision-making machines respectively; a weighted calculation unit adapted to carrying out a weighted calculation on results of judgment performed on the unknown program by each training model and a corresponding decision-making machine according to a preset weight of each kind of class behavior characteristic classification in each training model; said outputting unit 1740 particularly adapted to outputting an identification result of the unknown program according to a result of the weighted calculation.

Figure 18:
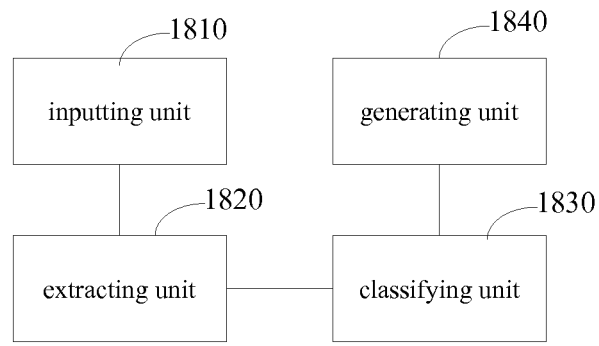
FIG. 18 is a block diagram of a further embodiment of a device for program identification based on machine learning of the application.

Reference is made to FIG. 18, which is a block diagram of a second embodiment of a device for program identification based on machine learning of the application, which device for program identification further has the function of generating a decision-making machine identifying the type of a program in comparison with FIG. 17.

The device comprises an inputting unit 1810, an extracting unit 1820, a classifying unit 1830 and a generating unit 1840.

Therein, the inputting unit 1810 is adapted to inputting extracted massive programs, wherein the massive programs comprise malicious programs and non-malicious programs;

the extracting unit 1820 is adapted to extracting a class behavior characteristic from each program inputted;

the classifying unit 1830 is adapted to coarsely classifying the extracted class behavior characteristic;

the generating unit 1840 is adapted to training, according to a result of the classification, class behavior characteristics of a different category by using a different training model to generate a decision-making machine or a set of decision-making machines for identifying a malicious program.

Or, the generating unit 1840 is adapted to training, according to a result of the classification, class behavior characteristics of a different category by using a different decision-making machine to generate a training model or a set of training models for identifying a malicious program.

In particular, the extracting unit 1820 may comprise (not shown in FIG. 18): a class behavior characteristic extracting unit adapted to analyzing each program file and extracting a pre-defined class behavior characteristic from the program file; a vector attribute generating unit adapted to generating, from extracted class behavior characteristics, a feature vector and a black-and-white attribute of each feature vector.

In particular, the classifying unit 1830 is adapted to judging the type of a compiler which compiles to generate a corresponding program according to an entry instruction sequence of a known compiler. A result of the coarse classification of the corresponding program may be determined according to the type of compiler, the type of file and/or the type of shelling, etc.

Therein, the coarse classification may for example classify the inputted program into a different category, such as a driver file, VB, VC, DELPHI, UPX, UPACK, NSPACK, ASPACK, etc. according to the characteristics of file, the type of compiler and/or the type of shelling, etc.

It can be seen from the description of the above implementations, the embodiments of the application, when identifying the type of an unknown program based on a class behavior characteristic, analyze the inputted unknown program, extract a class behavior characteristic in the unknown program, which class behavior characteristic comprises an import table library feature and an API feature of an import table, coarsely classify the unknown program according to the extracted class behavior characteristic, judge by inputting the unknown program into a corresponding decision-making machine generated by training according to a result of the coarse classification (or judge by inputting the unknown program into a generated training model and a corresponding decision-making machine), and output an identification result of the unknown program. The application adopts the machine learning technology, obtains a decision-making machine (or model) based on a class behavior characteristic for identifying a malicious program by extracting and analyzing a class behavior characteristic for a large number of program samples, and can save a lot of manpower and improve the identification efficiency for a malicious program by using the decision-making machine (or model); and furthermore, based on data mining for massive programs, can find an inherent law of programs based on a class behavior, prevent a malicious program that has not happened and make it difficult for a malicious program to avoid being killed.

It will be known to the skilled in the art that, the technologies in the embodiments of the application may be realized by way of software and a necessary universal hardware platform. Based on such an understanding, the technical solutions in the embodiments of the application, substantially or for the part contributing to the prior art, may be embodied in the form of a software product. This computer software product may be stored in a storage medium, such as ROM/RAM, a magnetic disk, a compact disc, etc, and comprises a number of instructions for cause a computer device (which may be a personal computer, a server, or a network device, etc.) to execute methods described in various embodiments or some parts of the embodiments.

Various embodiments in the specification are described by using a progressive manner, identical or similar parts of various embodiments may be referred relative to each other, and each embodiment highlights its difference from other embodiments. Especially, for an embodiment of a system, it is described relatively simply due to it similarity to a corresponding method embodiment, and as for its relevant parts reference may be made to the parts of the method embodiment.

The implementations described above of the application do not constitute a definition of the protection scope of the application. Any modifications, equivalent replacements and improvements made within the spirit and principle of the application should all be included within the protection scope of the application.

The invention claimed is:

1. A method for program identification based on machine learning, characterized by comprising:
    analyzing an inputted unknown program, and extracting a feature of the unknown program;
    coarsely classifying the unknown program according to the extracted feature;
    said extracting a feature of the unknown program and coarsely classifying the unknown program according to the extracted feature comprise: extracting a class behavior characteristic in the unknown program, wherein the class behavior characteristic comprises an import table library feature and an application programming interface API feature of an import table; and
    coarsely classifying the unknown program according to the extracted class behavior characteristic;
    or,
    said extracting a feature of the unknown program and coarsely classifying the unknown program according to the extracted feature comprise: extracting a structural feature of a PE file in the unknown program; and coarsely classifying the unknown program according to the extracted structural feature of a PE file;
    said structural feature of a PE file comprises at least one of the following features: a PE file header feature, a PE standard header feature, a PE optional header feature, a data directory feature, a commonly used section table feature;
    according to a result of the coarse classification, inputting the unknown program into a decision making machine for judging, which decision making machine is generated by training and corresponds to the result of the coarse classification; and
    outputting an identification result of the unknown program, wherein the identification result is a malicious program or a non-malicious program.

2. The method according to claim 1, characterized in that the import table library feature comprises:
    a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; and
    the API feature of an import table is a function feature selected from a library of the import table.

3. The method according to claim 1, characterized in that when a plurality of decision-making machines are included, said inputting the unknown program into a decision making machine for judging comprises:
    judging by inputting the unknown program into one or more corresponding decision-making machines generated by training, respectively; carrying out a weighted calculation on results of judgment performed on the unknown program by each decision-making machine according to a preset weight of each kind of feature classification in each decision-making machine;
    said outputting an identification result of the unknown program is in particular: outputting an identification result of the unknown program according to a result of the weighted calculation.

4. The method according to claim 3, characterized in that, said carrying out a weighted calculation on results of judgment performed on the unknown program by each decision-making machine according to a preset weight of each kind of feature classification in each decision-making machine comprises:
    carrying out a weighted calculation on results of judgment performed on the unknown program by each decision-making machine according to a preset weight of each kind of structural feature classification of a PE file in each decision-making machine;
    or,
    carrying out a weighted calculation on results of judgment performed on the unknown program by each decision-making machine according to a preset weight of each kind of class behavior characteristic classification in each decision-making machine.

5. The method according to claim 4, characterized by further comprising:
    inputting extracted massive programs, wherein the massive programs comprise malicious programs and non-malicious programs;
    extracting a feature from each program file inputted and coarsely classifying the extracted feature;
    training, according to a result of the coarse classification, features of a different category by using a different training model to generate a decision-making machine or a set of decision-making machines for identifying a malicious program.

6. The method according to claim 5, characterized in that, said extracting a feature from each program inputted and coarsely classifying the extracted feature, and training, according to a result of the coarse classification, features of a different category by using a different training model to generate a decision-making machine or a set of decision-making machines for identifying a malicious program comprise:
    extracting a structural feature of a PE file from each program inputted and coarsely classifying the extracted structural feature of a PE file, and training, according to a result of the coarse classification, structural features of a PE file of a different category by using a different training model to generate a decision-making machine or a set of decision-making machines for identifying a malicious program;

or, extracting a class behavior characteristic from each program inputted and coarsely classifying the extracted class behavior characteristics, and training, according to a result of the coarse classification, class behavior characteristics of a different category by using a different training model to generate a decision-making machine or a set of decision-making machines for identifying a malicious program.

7. The method according to claim 5, characterized in that, said extracting a feature from each program inputted comprises:

analyzing each program file and extracting a pre-defined feature from the program file;

generating, from extracted features, a feature vector and a black-and-white attribute of each feature vector.

8. The method according to claim 5, characterized in that, said extracting a feature from each program inputted comprises:

analyzing each program file and extracting a pre-defined structural feature of a PE file from the program file; generating, from extracted structural features of a PE file, a feature vector and a black-and-white attribute of each feature vector;

or, analyzing each program file and extracting a pre-defined class behavior characteristic from the program file; generating, from extracted class behavior characteristics, a feature vector and a black-and-white attribute of each feature vector.

9. The method according to claim 5, characterized in that said coarsely classifying the extracted feature is in particular:

judging the type of a compiler which compiles to generate a corresponding program according to an entry instruction sequence of a known compiler, and determining a result of the coarse classification of the corresponding program according to the type of compiler, the type of file and/or the type of shelling.

10. The method according to claim 5, characterized in that a decision-making machine is trained by using a vector machine, or, a decision-making machine is trained by using a decision tree.

11. The method according to claim 3, characterized in that, said training model is a training model with encoding, or a training model with compressing.

12. A device for program identification based on machine learning, characterized by comprising:

A memory;

an extracting unit adapted to analyzing an inputted unknown program, and extracting a feature of the unknown program;

a classifying unit adapted to coarsely classifying the unknown program according to the extracted feature;

said extracting unit is particularly adapted to analyzing an inputted unknown program, and extracting a class behavior characteristic in the unknown program, wherein the class behavior characteristic comprises an import table library feature and an application programming interface API feature of an import table; and said classifying unit is particularly for coarsely classifying the unknown program according to the extracted class behavior characteristic;

or, said extracting unit is particularly adapted to analyzing an inputted unknown program, and extracting a structural feature of a PE file in the unknown program; and said classifying unit is particularly for coarsely classifying the unknown program according to the extracted structural feature of a PE file;

said extracting unit is particularly adapted to extracting at least one of the following features in the unknown program: a PE file header feature, a PE standard header feature, a PE optional header feature, a data directory feature, a commonly used section table feature;

or, said extracting unit is particularly adapted to extracting the import table library feature and the API feature of an import table in the unknown program, the import table library feature comprises: a class feature of network, a class feature of advanced WIN32 application programming interface, a class feature of system kernel, a class feature of application programming interface related to a user interface of an operating system, a class feature of graphical user interface module shared by application programs of an operating system, a class feature of hardware abstraction layer module of an operating system, a class feature of virtual machine related module, a class feature of standard C runtime library program, a class feature of object linking and embedding related module, a class feature of operating system process state supporting module, a class feature of 32-bit shell dynamic link library file of an operating system, a class feature of address dynamic link library file; and the API feature of an import table is a function feature selected from the library of the import table;

a judging unit adapted to, according to a result of the coarse classification, inputting the unknown program into a decision making machine for judging, which decision making machine is generated by training and corresponds to the result of the coarse classification; and an outputting unit adapted to outputting an identification result of the unknown program, wherein the identification result is a malicious program or a non-malicious program, wherein the extracting unit, classifying unit, judging unit, and outputting unit are executing on one or more memory.

13. The device according to claim 12, characterized in that, said judging unit comprises:

a program inputting unit adapted to when a plurality of decision-making machines are included, judging by inputting the unknown program into a corresponding plurality of decision-making machines generated by training respectively;

a weighted calculation unit adapted to carrying out a weighted calculation on results of judgment performed on the unknown program by each decision-making machine according to a preset weight of each kind of feature classification in each decision-making machine;

said outputting unit particularly adapted to outputting an identification result of the unknown program according to a result of the weighted calculation, wherein the program inputting unit, weighted calculation unit, and outputting unit are executing on one or more memory.

14. The device according to claim 12, characterized by further comprising:

an inputting unit adapted to inputting extracted massive programs, wherein the massive programs comprise malicious programs and non-malicious programs;

an extracting unit adapted to extracting a feature from each program inputted;

a classifying unit adapted to coarsely classifying the extracted feature;

a generating unit adapted to training, according to a result of the classification, features of a different category by using a different training model to generate a decision-making machine or a set of decision-making machines for identifying a malicious program, wherein the inputting unit, extracting unit, classifying unit and generating unit are executing on one or more memory.

15. The device according to claim 14, characterized in that, said extracting unit comprise:

a program file analyzing unit adapted to analyzing each program file and extracting a pre-defined feature from the program file;

a vector attribute generating unit adapted to generating, from extracted features, a feature vector and a black-and-white attribute of each feature vector, wherein the extracting unit, analyzing unit and generating unit are executing on one or more memory.

16. The device according to claim 14, characterized in that said classifying unit is particular adapted to judging the type of a compiler which compiles to generate a corresponding program according to an entry instruction sequence of a known compiler, and determining a result of the coarse classification of the corresponding program according to the type of compiler, the type of file and/or the type of shelling, wherein the classifying unit is executed on one or more memory.

17. The device according to claim 13, characterized in that said feature comprises: a structural feature of a PE file and/or a class behavior characteristic, wherein the class behavior characteristic comprises an import table library feature and an application programming interface API feature of an import table.

* * * * *